US011070419B2

(12) United States Patent
Palavalli et al.

(10) Patent No.: US 11,070,419 B2
(45) Date of Patent: Jul. 20, 2021

(54) METHODS AND SYSTEMS TO TROUBLESHOOT AND LOCALIZE STORAGE FAILURES FOR A MULTITENANT APPLICATION RUN IN A DISTRIBUTED COMPUTING SYSTEM

(71) Applicant: VMware, Inc., Palo Alto, CA (US)

(72) Inventors: Amarnath Palavalli, Palo Alto, CA (US); Mohsin Beg, Palo Alto, CA (US); Shashank Pedamallu, Palo Alto, CA (US); Sai Samrat Karlapudi, Palo Alto, CA (US); Manjunath Shankar, Palo Alto, CA (US); Ramsés Morales, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 185 days.

(21) Appl. No.: 16/044,303

(22) Filed: Jul. 24, 2018

(65) Prior Publication Data

US 2020/0036575 A1 Jan. 30, 2020

(51) Int. Cl.
*H04L 12/24* (2006.01)
*H04L 12/26* (2006.01)
*G06F 16/27* (2019.01)

(52) U.S. Cl.
CPC .......... *H04L 41/0659* (2013.01); *G06F 16/27* (2019.01); *H04L 41/0668* (2013.01); *H04L 41/0672* (2013.01); *H04L 41/0677* (2013.01); *H04L 43/0811* (2013.01); *H04L 43/10* (2013.01)

(58) Field of Classification Search
CPC ..... H04L 67/1095–097; H04L 43/0817; H04L 43/10; H04L 41/0659; G06F 11/1464
See application file for complete search history.

(56) References Cited

U.S. PATENT DOCUMENTS

| 8,190,947 B1* | 5/2012 | Holl ................... G06F 11/1435 709/203 |
| 9,448,877 B2* | 9/2016 | Candelaria .......... G06F 11/1004 |
| 2006/0248118 A1* | 11/2006 | Curtis ................ H04L 43/0817 |
| 2018/0239677 A1* | 8/2018 | Chen .................... G06F 11/203 |

\* cited by examiner

*Primary Examiner* — Hassan Kizou
*Assistant Examiner* — Hector Reyes

(57) ABSTRACT

Computational methods and systems that troubleshoot and localize failures in data storage of a multitenant application are executed in a multitenant database management system that comprises a control plane of control plane nodes and a data plane of independent and isolated data plane nodes. Each control plane node receives data requests and data queries. Each data plane node maintains data storage for tenants of the multitenant application and executes data storage and data query operations requested by the control plane nodes. Methods and system determine whether data plane nodes are network connected and whether the data cores of network connected data plane nodes are available to ingest data and respond to data queries. Data cores of disconnected data plane nodes and unavailable data cores are isolated from data ingestion and data queries. Remedial measures are executed to restore disconnected data plane nodes and unavailable data cores.

21 Claims, 27 Drawing Sheets

METHODS AND SYSTEMS TO TROUBLESHOOT AND LOCALIZE STORAGE FAILURES FOR A MULTITENANT APPLICATION RUN IN A DISTRIBUTED COMPUTING SYSTEM

TECHNICAL FIELD

This disclosure is directed to methods and systems that manage data storage of a multitenant application run in a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In recent years, distributed computing system have made possible the development of various models for providing applications services to customers, called "tenants." The applications are hosted on server computers in a distributed computing system, licensed to tenants, and tenant data is stored in the distributed computing systems. However, data storage and data query failures, and recovery of tenant data as a result of a such failures, continue to adversely impact tenants and service providers. The failures are typically due to hard drive, network, and server computer failures. System administrators and tenants continue to seek methods and systems that identify and troubleshoot such failures.

SUMMARY

Computational methods and systems that troubleshoot and localize failures in data storage of a multitenant application run in a distributed computing system are disclosed. Methods and systems are executed in a multitenant database management system that comprises a control plane and data plane. The control plane comprises control plane nodes. The data plane comprises independent and isolated data plane nodes. Each control plane node receives data and data queries. Each data plane node maintains data storage for one or more tenants of the multitenant application in data cores and executes data storage and data query operations requested by the control plane nodes. Methods and systems determine network connection status of each data plane node and availability status of the data cores of each connected data plane node. The data cores of disconnected data plane nodes are identified as unavailable data cores and isolated from data storage ingestion and data queries. Methods execute recovery procedures to restore disconnected data plane nodes, restore unavailable data cores, and restore data ingestion and data queries.

DETAILED DESCRIPTION

This disclosure presents computational methods and systems to troubleshoot and localize storage failures associated with a multitenant application run in a distributed computing system. In a first subsection, computer hardware, complex computational systems, and virtualization are described. Containers and containers supported by virtualization layers are described in a second subsection. Methods to troubleshoot and localize storage failures for a multitenant application run in a distributed computing system are described below in a fourth subsection.

Computer Hardware, Complex Computational Systems, and Virtualization

The term "abstraction" is not intended to mean or suggest an abstract idea or concept. Computational abstractions are tangible, physical interfaces that are implemented using physical computer hardware, data-storage devices, and communications systems. The term "abstraction" refers to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is a sequence of encoded symbols stored in a file on an optical disk or within an electromechanical mass-storage device. When encoded computer instructions are loaded into an electronic memory within a computer system and executed on a physical processor the software implemented functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
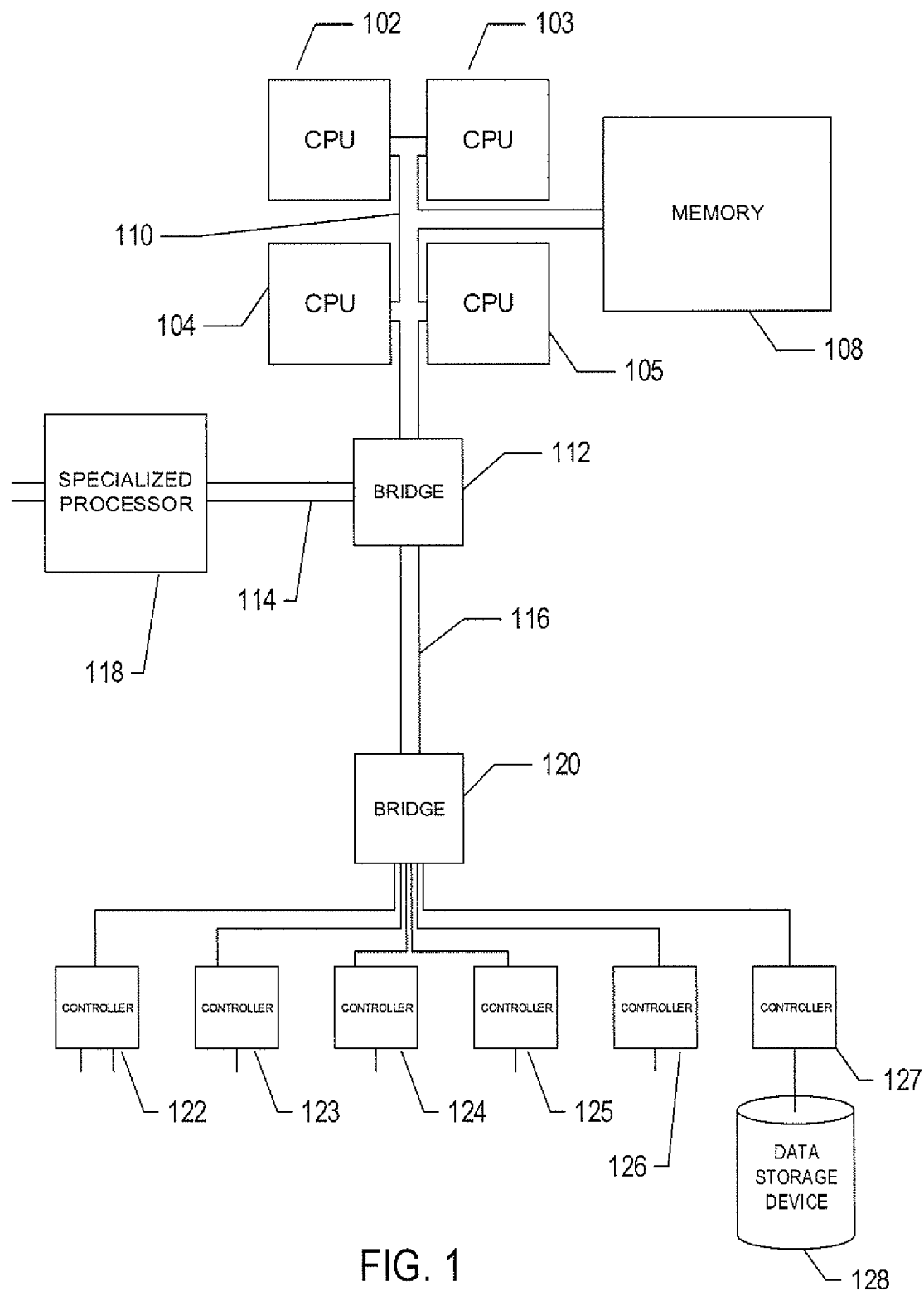
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
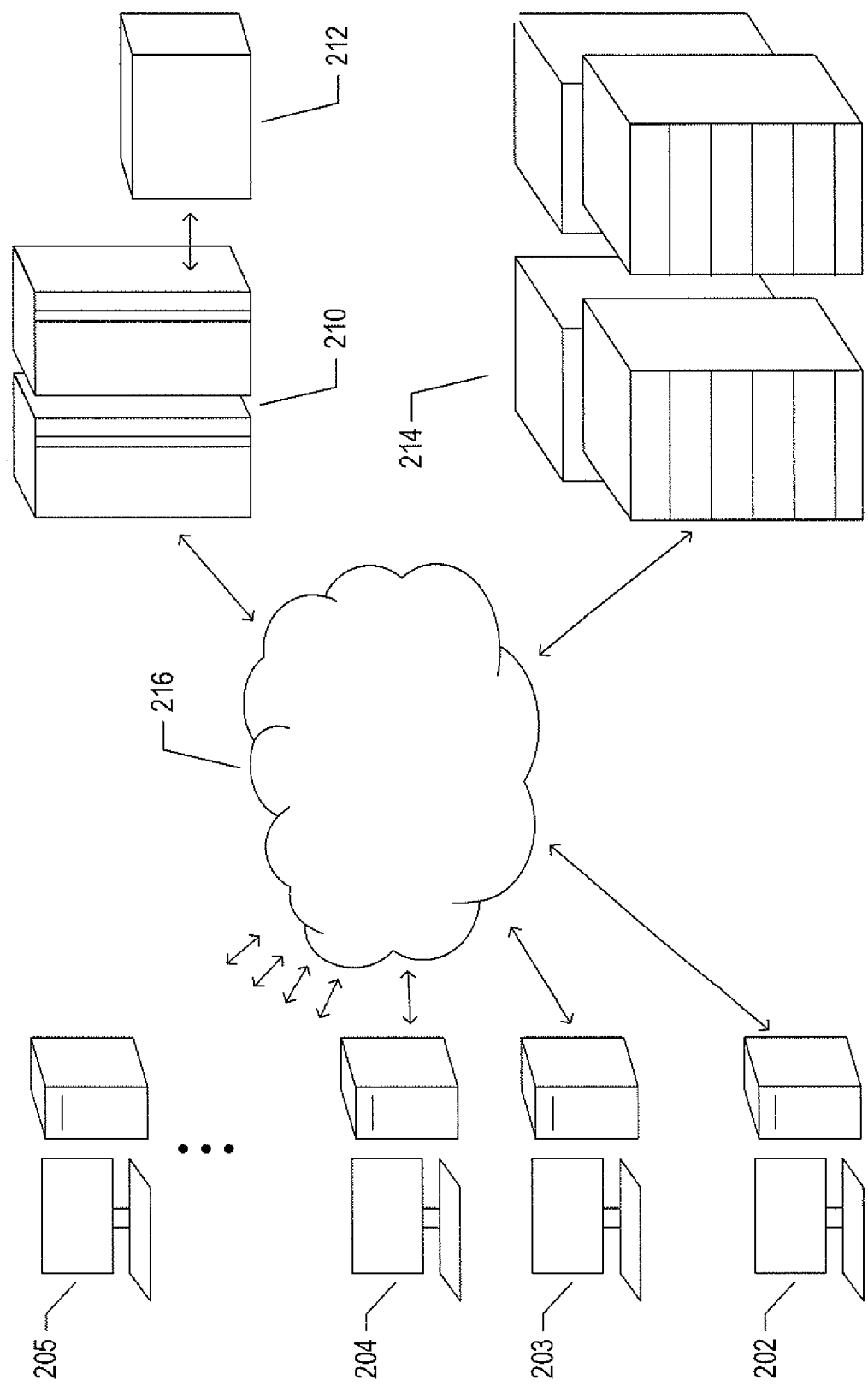
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
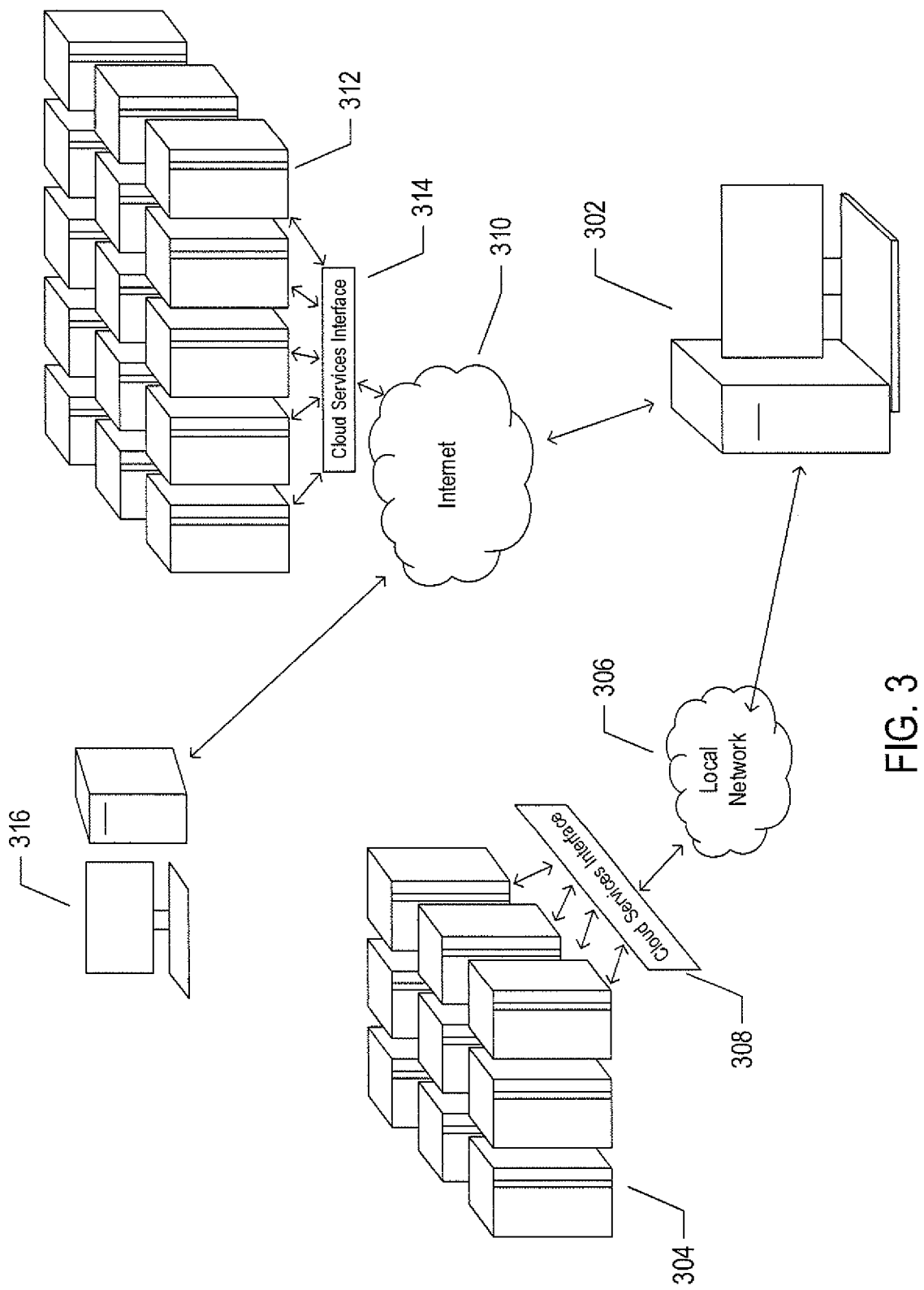
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
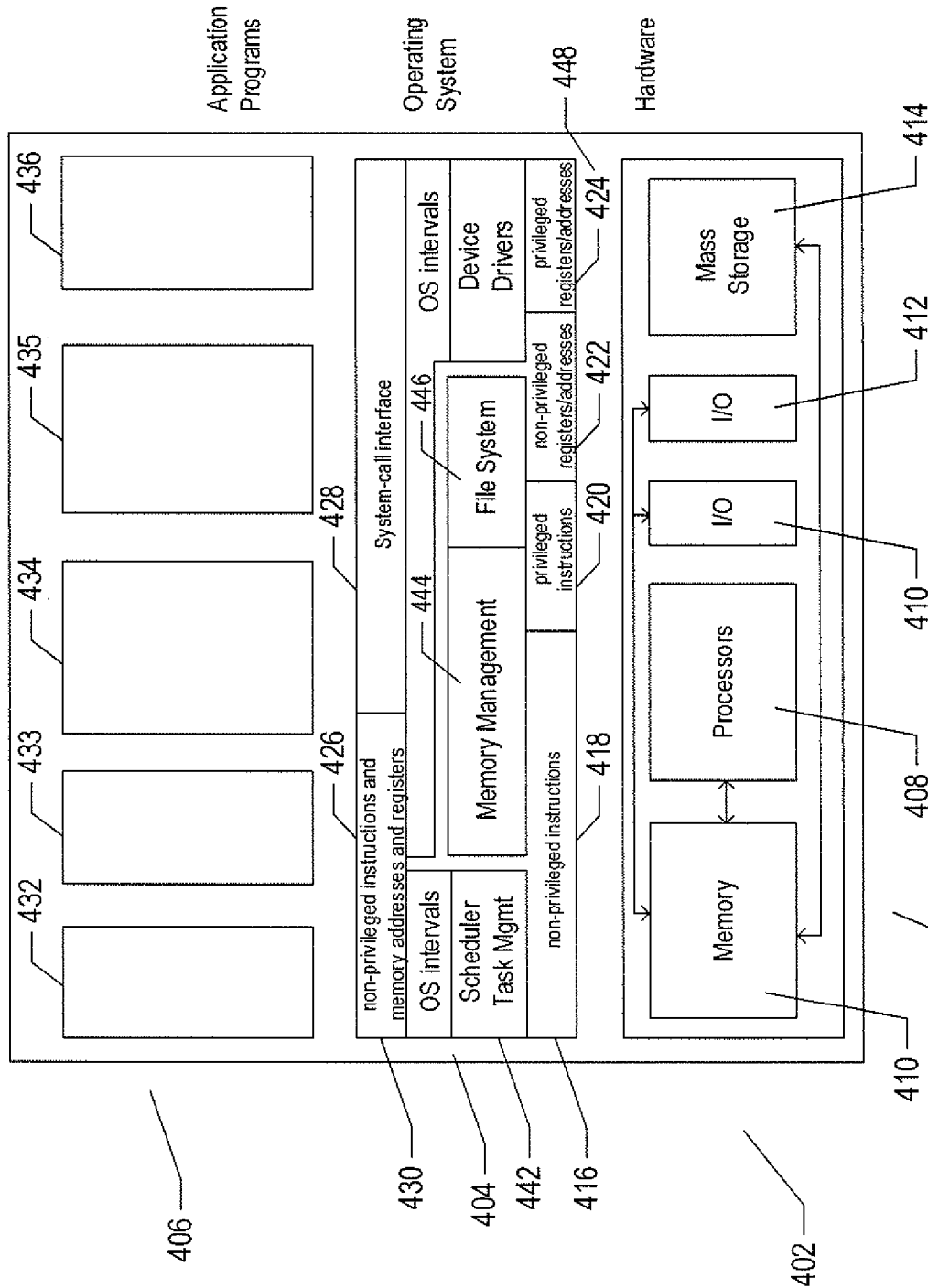
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
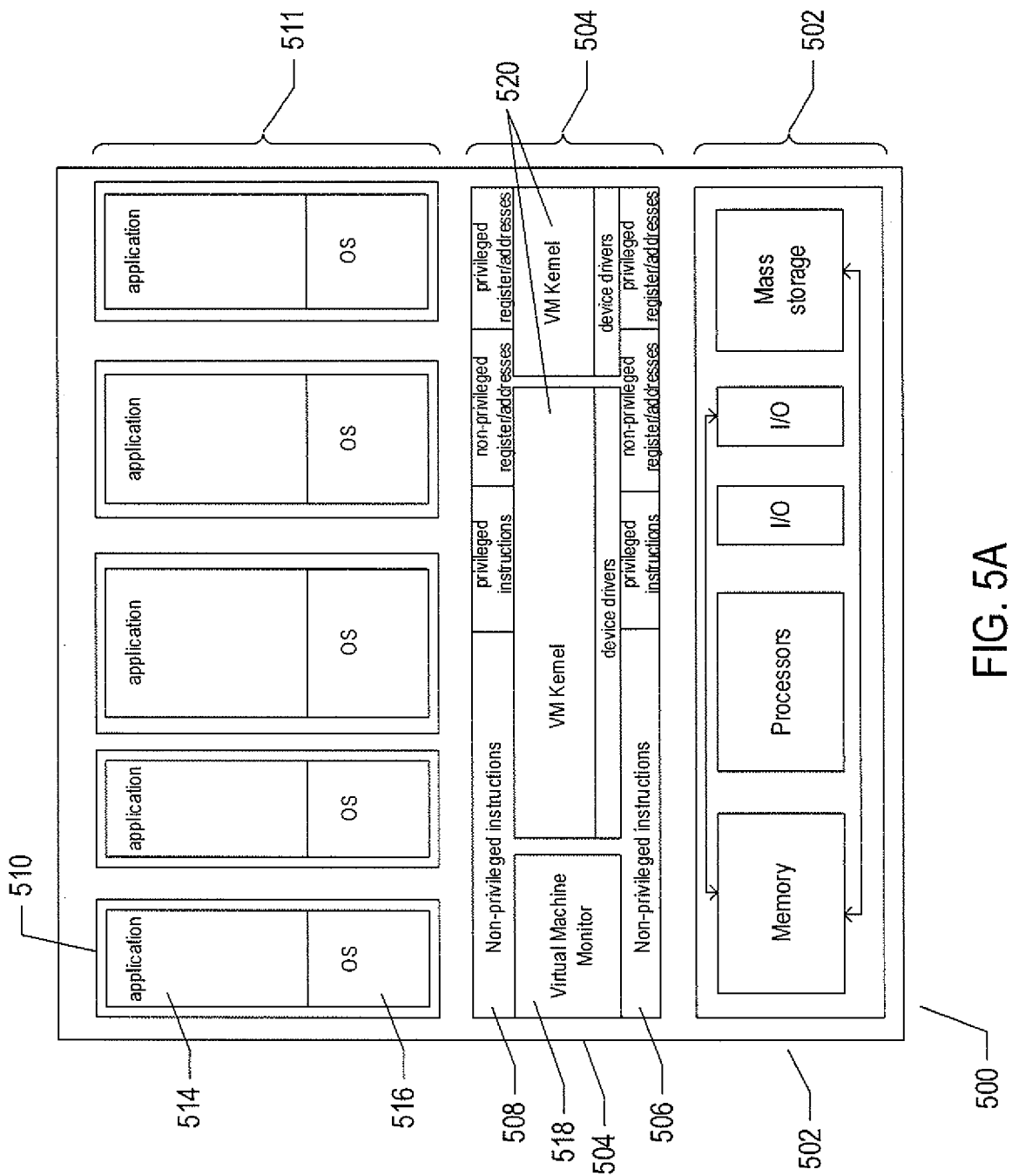
FIGS. 5A-5B show two types of virtual machine ("VM") and VM execution environments.
Figure 5B:
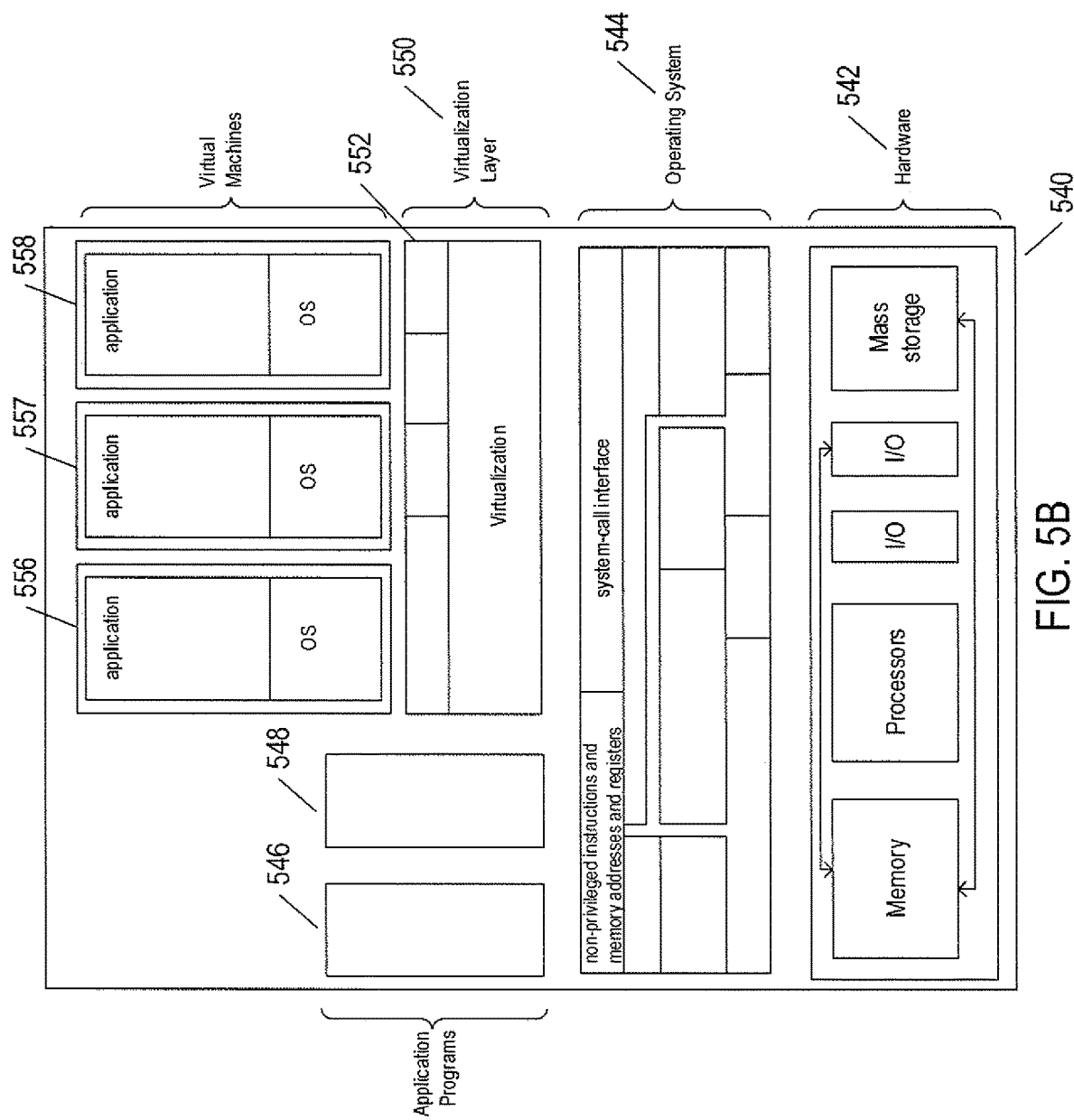

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
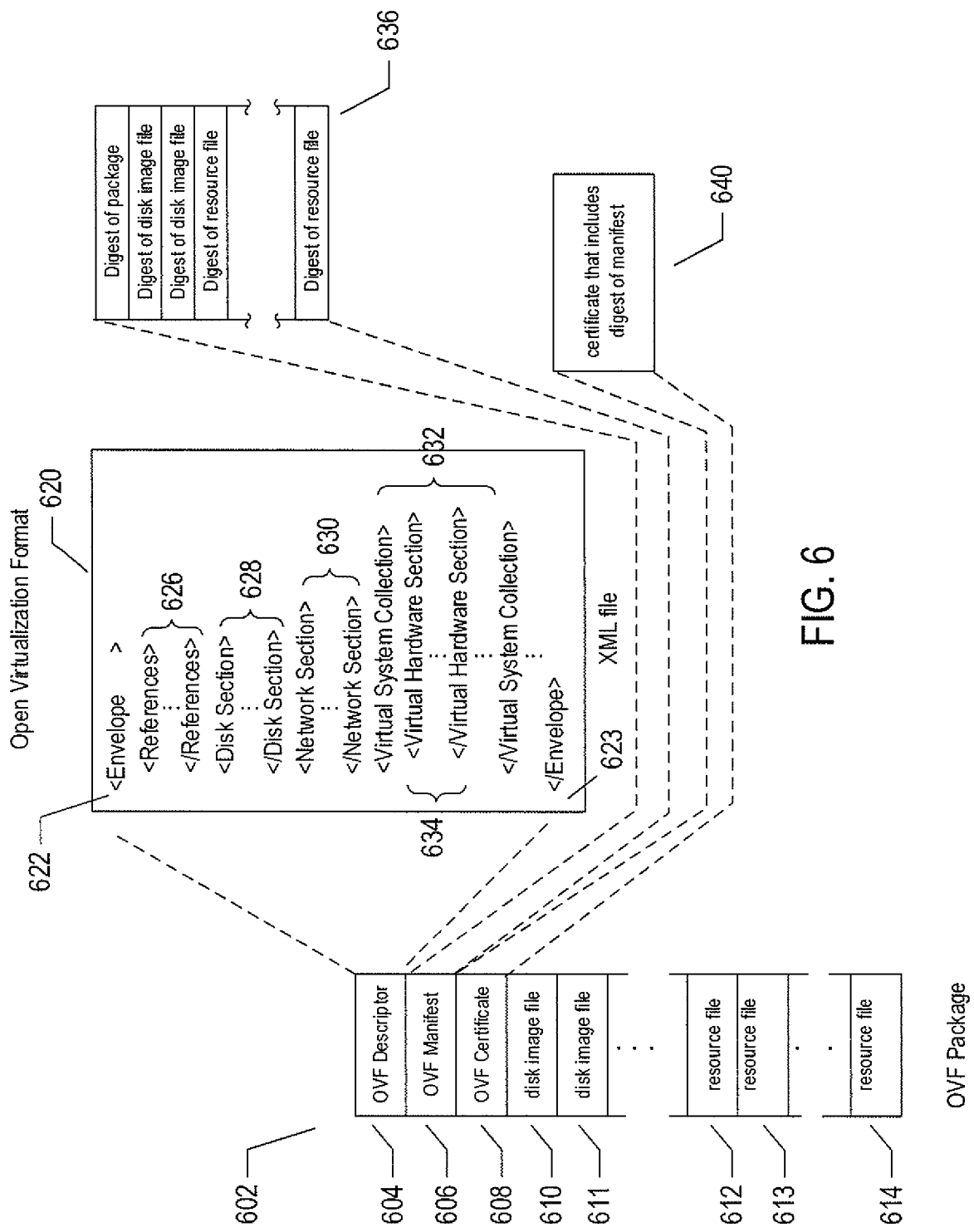
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
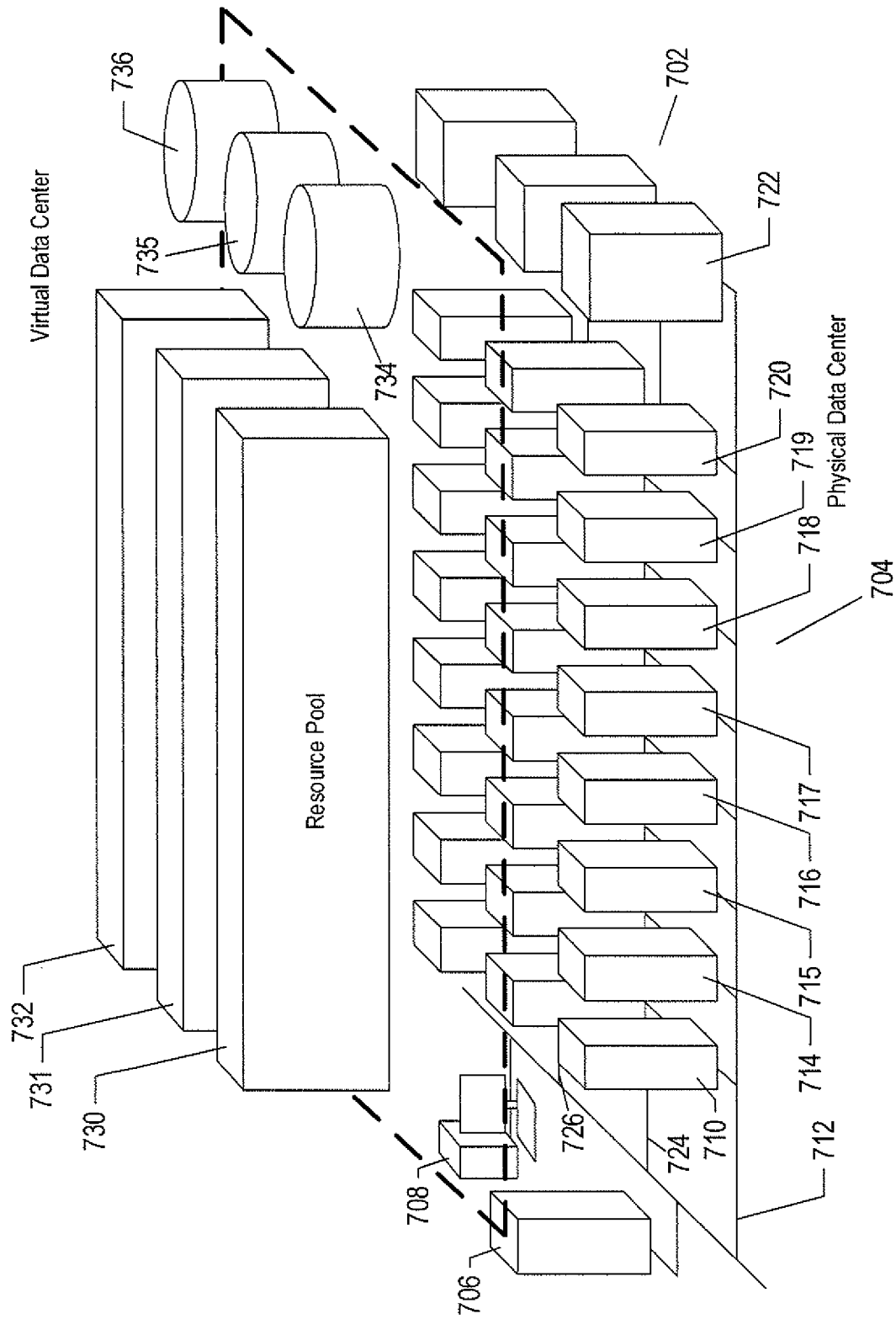
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
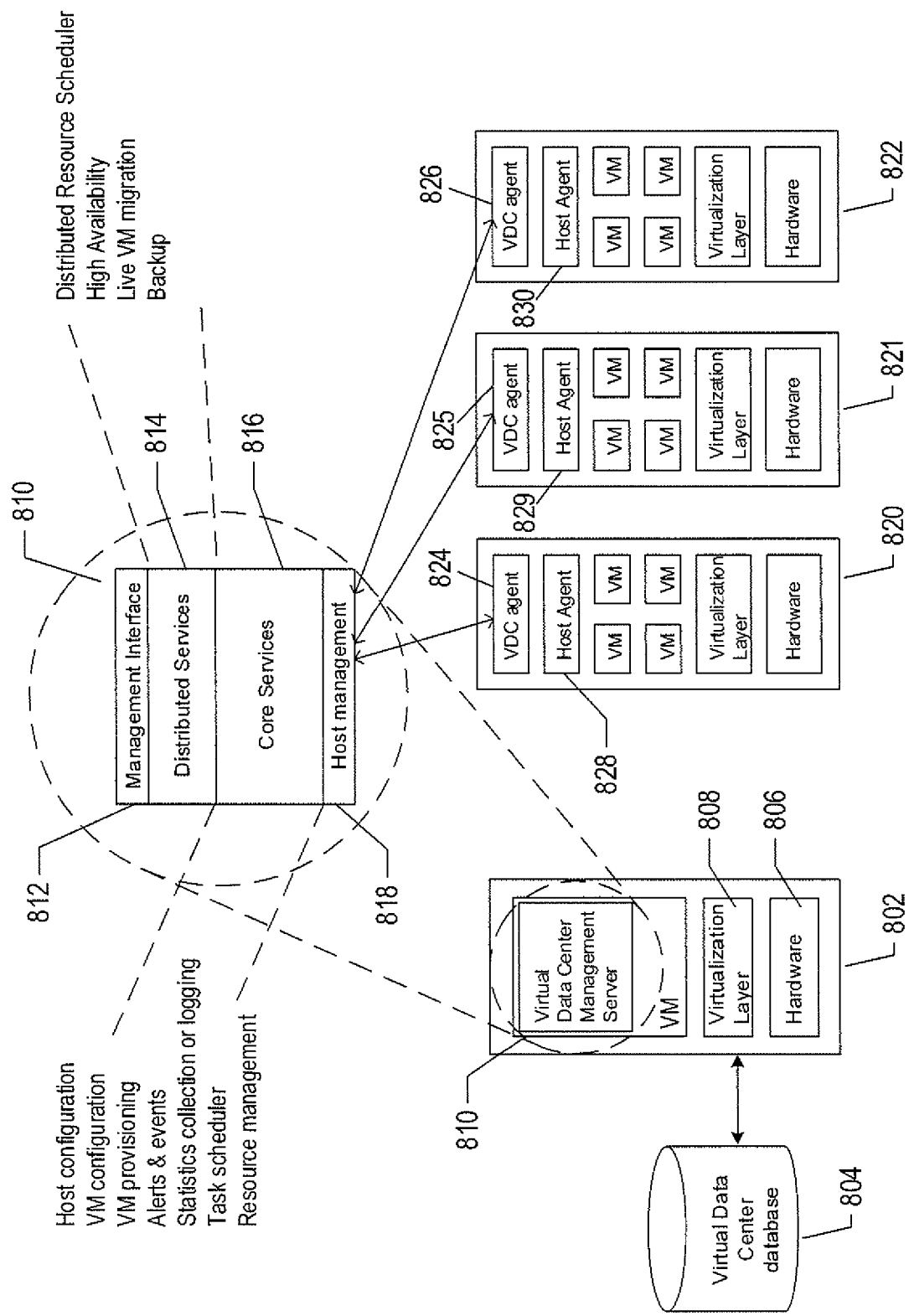
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
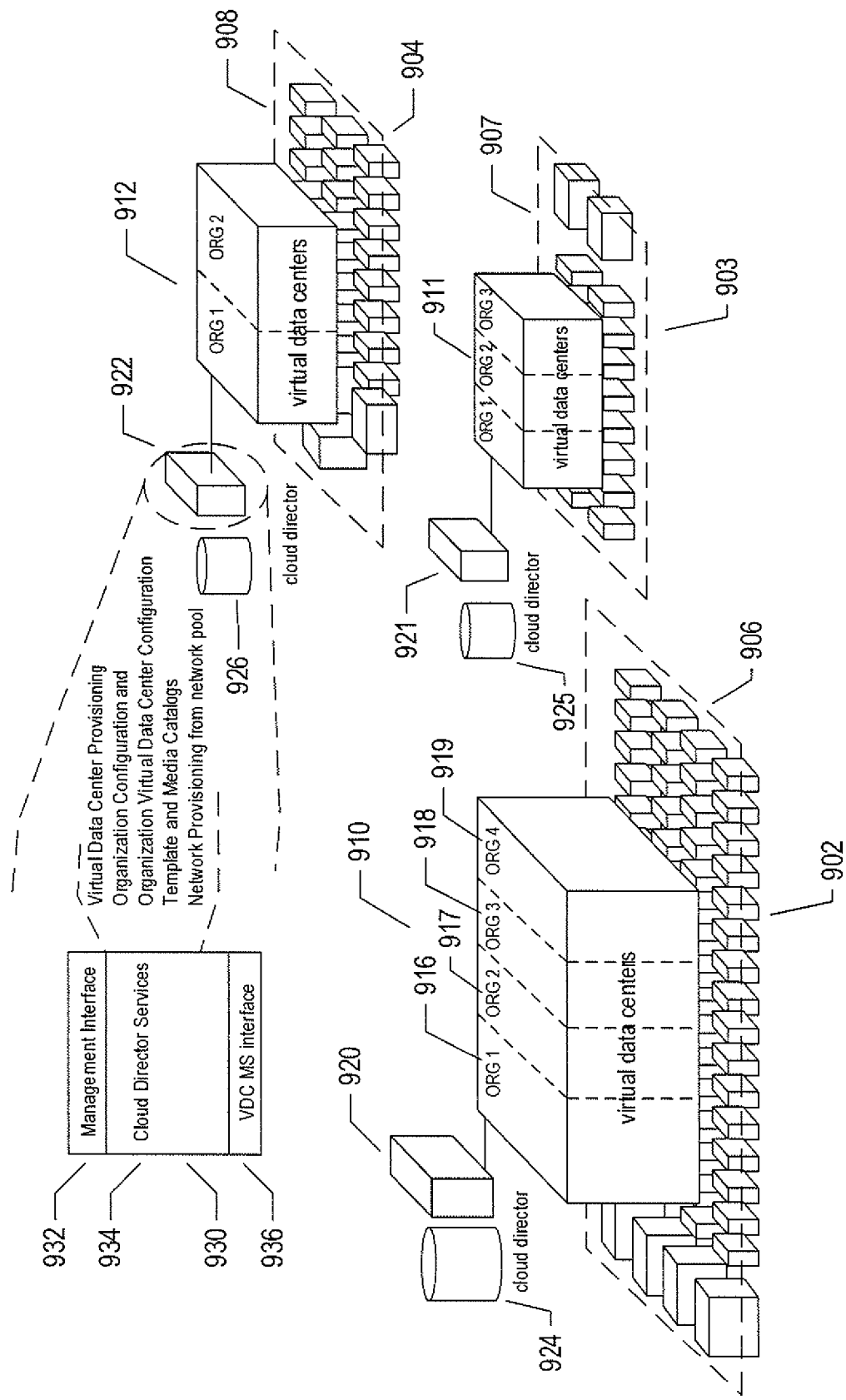
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
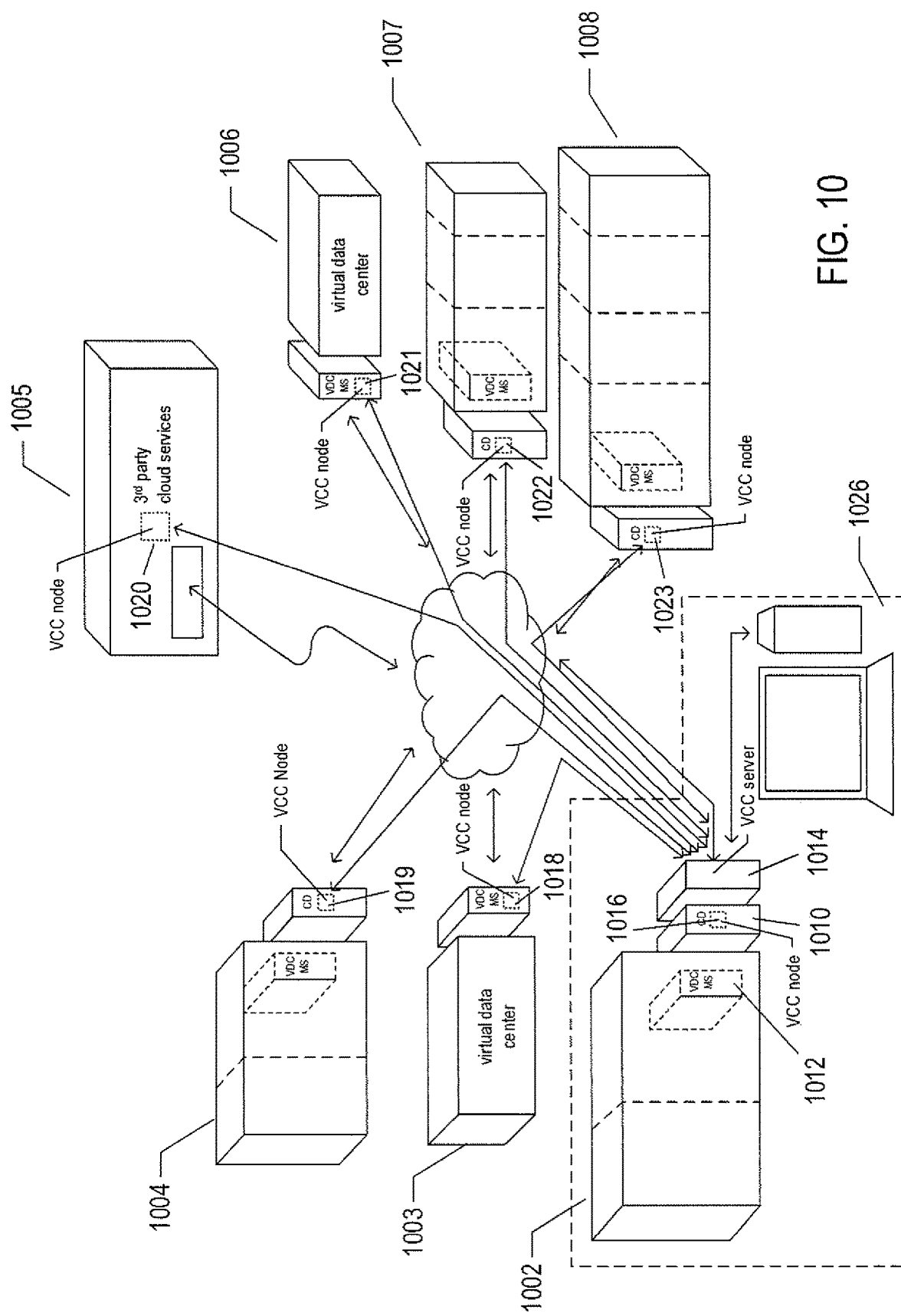
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by
Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
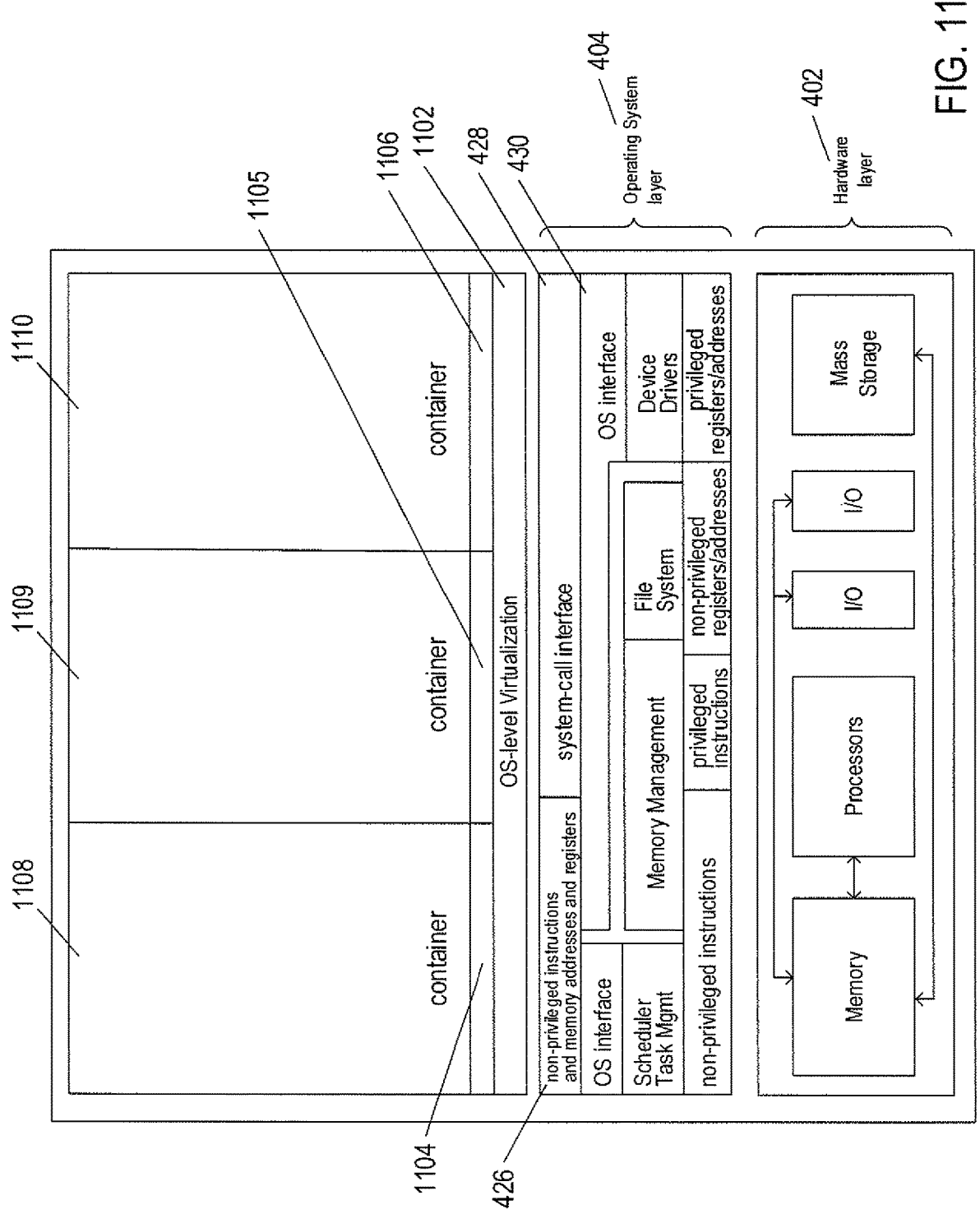
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
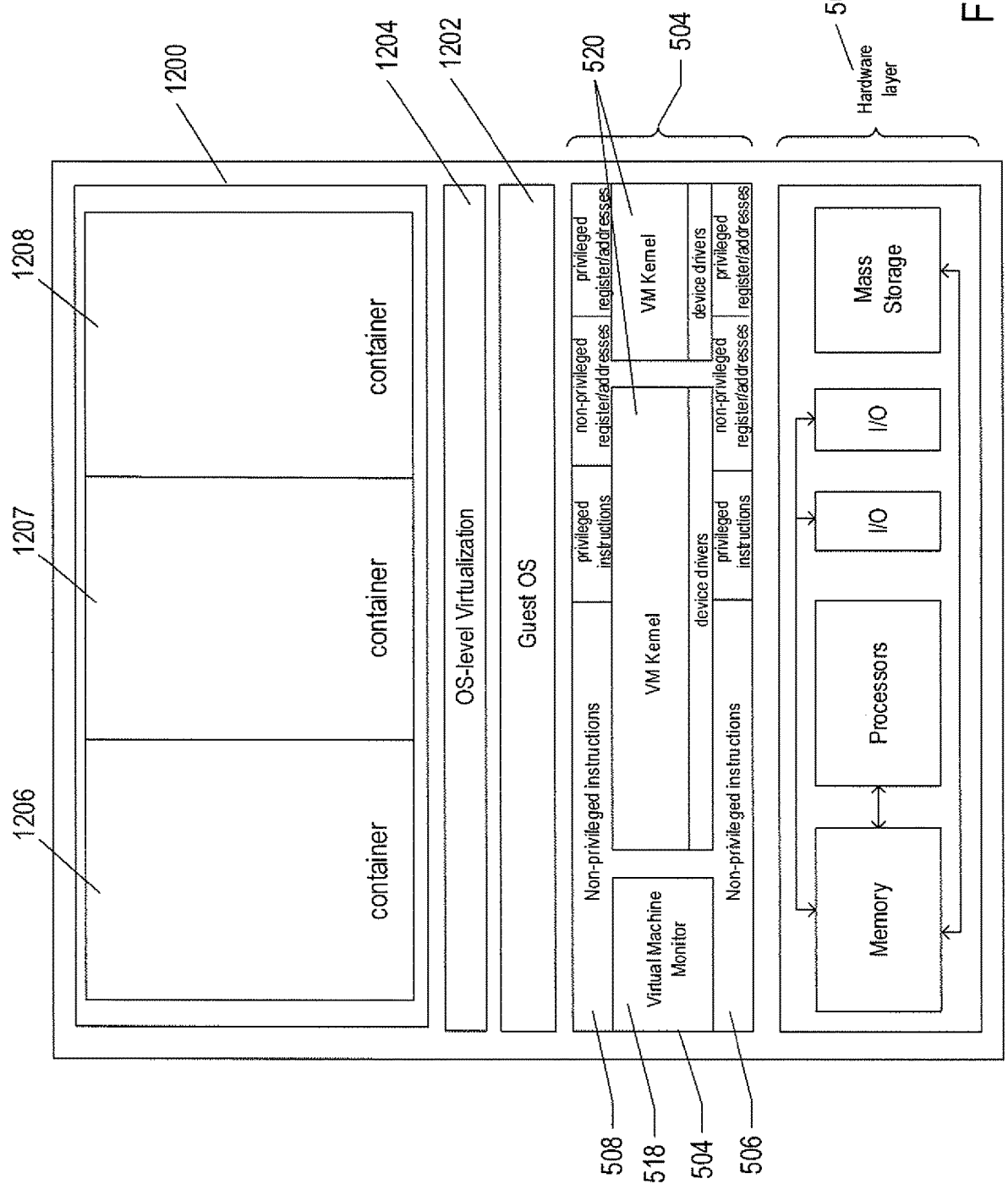
FIG. 12 shows an approach to implementing the containers on a VM.

FIG. 12 shows an approach to implementing containers on a VM 1200. FIG. 12 shows a host computer similar to that shown in FIG. 5A, discussed above. The host computer includes a hardware layer 502 and a virtualization layer 504 that provides a virtual hardware interface 508 to a guest operating system 1202. Unlike in FIG. 5A, the guest operating system interfaces to an OSL-virtualization layer 1204 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
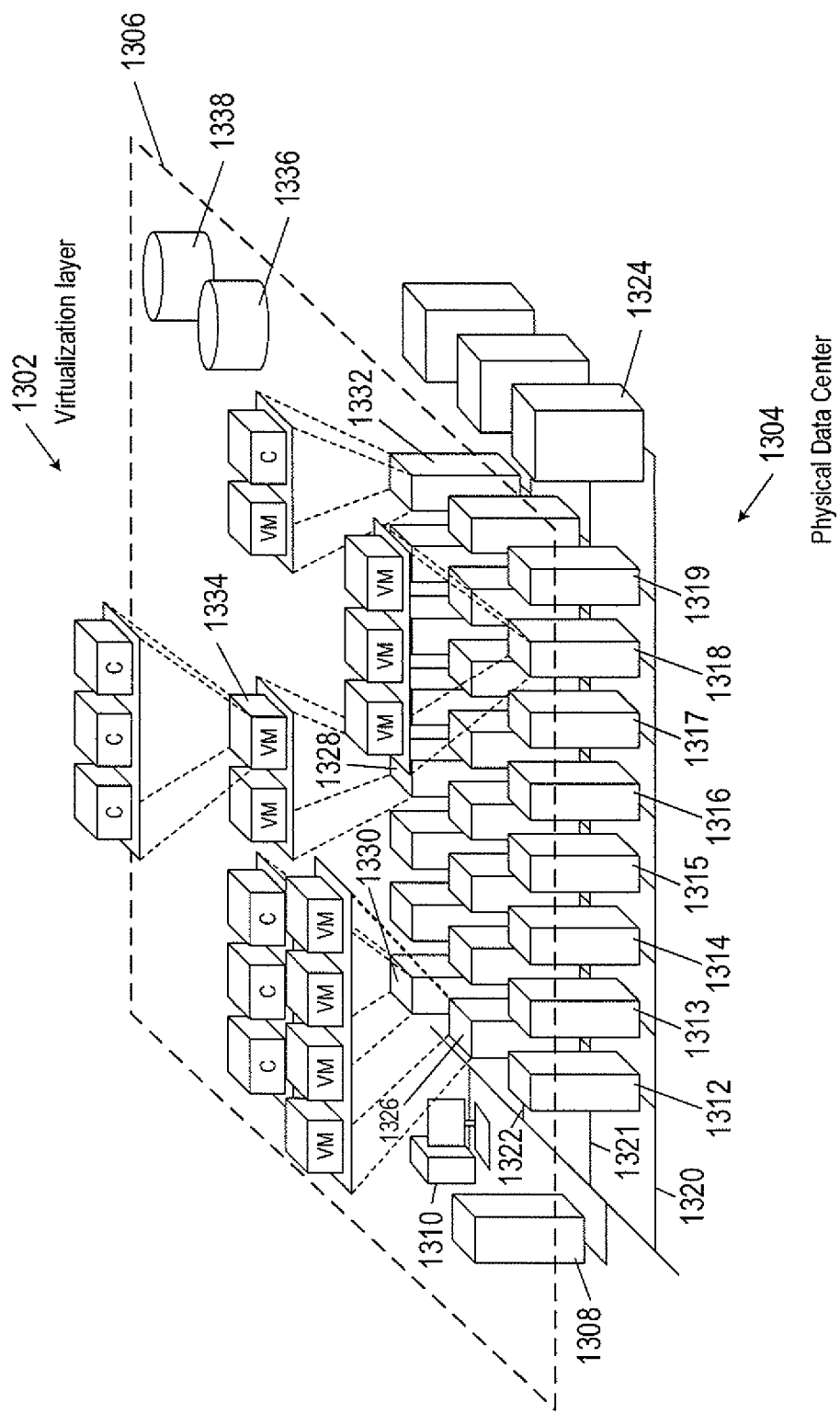
FIG. 13 shows an example of a virtualization layer located above a physical data center.

Methods and Systems to Troubleshoot and Localize Storage Failures for a Multitenant Application Run in a Distributed Computing System FIG. 13 shows an example of a virtualization layer 1302 located above a physical data center 1304. The virtualization layer 1302 is separated from the physical data center 1304 by a virtual-interface plane 1306. The physical data center 1304 comprises a management server computer 1308 and any of various computers, such as PC 1310, on which a virtual-data-center management interface may be displayed to system administrators and other users. The physical data center 1304 additionally includes many server computers, such as server computers 1312-1319, that are coupled together by local area networks 1320-1322. In the example of FIG. 13A, each local area network directly interconnects a bank of eight server computers and a mass-storage array. For example, local area network 1320 directly interconnects server computers 1312-1319 and a mass-storage array 1324.

Different physical data centers may be composed of many different types of computers, networks, data-storage systems and devices connected according to many different types of connection topologies.

The virtualization layer 1302 includes virtual objects, such as VMs and containers, hosted by different server computers, as described above with reference to Figures SA-5B and 11. For example, server computer 1318 host three VMs, server computer 1326 host four VMs, server computer 1328 host two VMs, server computer 1330 host three containers denoted by "C," and server computer 1332 host a VM and container. As described above with reference to FIG. 12, a VM 1334 hosted by server computer 1328 host three containers. The virtual-interface plane 1306 abstracts the physical data storage of the mass-storage arrays to virtual data stores 1336 and 1338 used by the virtual objects.

The physical data center 1304 may be used to run single and multiple tenant application models that serve multiple tenants. A tenant may be a group of users or a single user who pays for common access to an application with specific privileges to an application instance. The term "tenant application model" refers to how a tenant's stored data is organized and is mapped to storage. With a single tenant application model, a tenant purchases their own copy of an application and the application may be customized to meet the specific needs of the tenant. Each copy of the application may be run on a server computer, a VM, or in a container and is accessible by only one tenant. For example, the four VMs running on the server computer 1330 in FIG. 13 may each run a separate copy of the same application each of which is accessed by a different tenant. Each tenant has a separate standalone database accessed by the application. The single tenancy model provides database isolation for each tenant, which requires sufficient resources be allocated to each database to handle peak workloads. As a result, the single tenancy application model can be expensive from an overall database cost perspective.

By contrast, with a multi-tenant application model, a single instance of an application serves multiple tenants. The application instance may be run on a server computer, in a VM, or in a container of a distributed computing system, such as a VM or a container shown in FIG. 13. With a multitenant application model, an application is designed to provide every tenant a dedicated share of the instance, including application data, configuration, user management, tenant individual functionality, and non-functional properties. Each tenant's data may be stored in a separate database or may be isolated in a horizontally partitioned multitenant database. The multitenant database is partitioned such that each tenant's data is inaccessible by other tenants. A software-as-a-service ("SaaS") provider, for example, may run one instance of an application in a VM or a container that provides web access to multiple tenants and stores each tenant's data separately in a horizontally partitioned multi-tenant database.

Methods and systems are directed to troubleshooting and localizing failures in storage of tenant data generated by a multitenant application run in a distributed computing system. Methods and systems are implemented as a database management system for a multitenant application. The database management system comprises a control plane and a data plane. The control plane comprises control plane nodes. The data plane comprises independent and isolated data plane nodes. Each control plane node manages data ingestion and data queries. Each data plane node maintains data storage for one or more tenants of the multitenant application and executes data storage and data query operations requested by the control plane nodes. The control plane nodes and the data plane nodes may be deployed in server computers, VMs, and containers of the distributed computer system.

Figure 14:
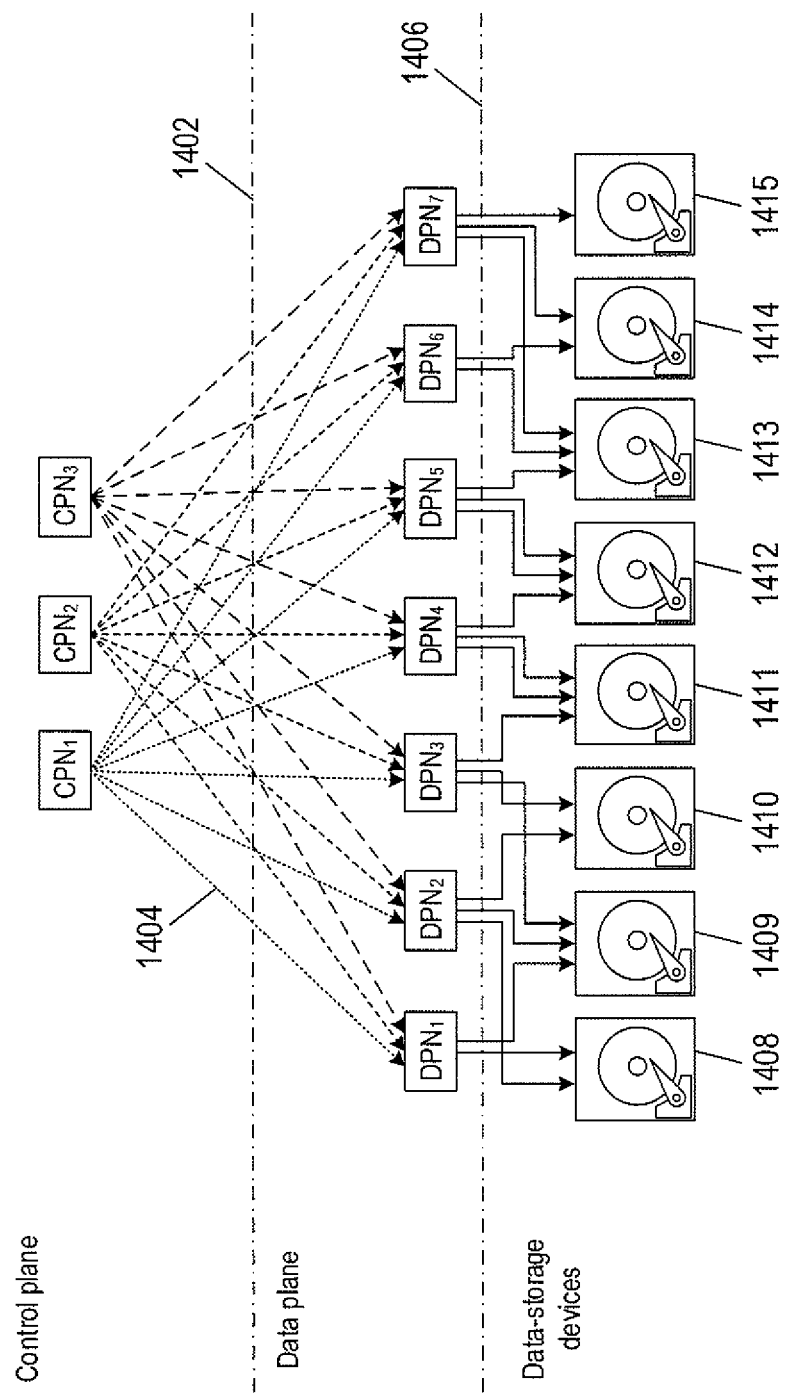
FIG. 14 shows an example of control plane nodes and data plane nodes of a database management system.

FIG. 14 shows an example of three control plane nodes and seven data plane nodes of a database management system for managing data storage of a multitenant application run in a distributed computing system. The control plane nodes are denoted by $CPN_1$, $CPN_2$, and $CPN_3$. The data plane nodes are denoted by $DPN_1$, $DPN_2$, $DPN_3$, $DPN_4$, $DPN_5$, $DPN_6$, and $DPN_7$. Dot-dash line 1402 represents separation between the control plane nodes and the data plane nodes. Each control plane node sends operation requests to the data plane nodes. Differently patterned directional arrows represent operation requests sent from each of the control plane nodes to the data plane nodes. For example, dotted directional arrows, such as dotted directional arrow 1404, represent operation requests sent from control plane node $CPN_1$ to the data plane nodes $DPN_1$, $DPN_2$, $DPN_3$, $DPN_4$, $DPN_5$, $DPN_6$, and $DPN_7$. Dot-dash line 1406 represents separation between the data plane nodes and the physical data storage devices used to physically store tenant data. The data-storage devices 1408-1415 may be server computer hard drives and/or data-storage device hard drives. In the example of FIG. 14, each data plane node maintains tenant data stored in one, two, or three different data-storage devices as indicated by directional arrows. For example, $DPN_1$ contains and manages tenant data stored in data-storage devices 1408 and 1409. $DPN_2$ contains and manages tenant data stored in data-storage devices 1408, 1409, and 1410.

Figure 15:
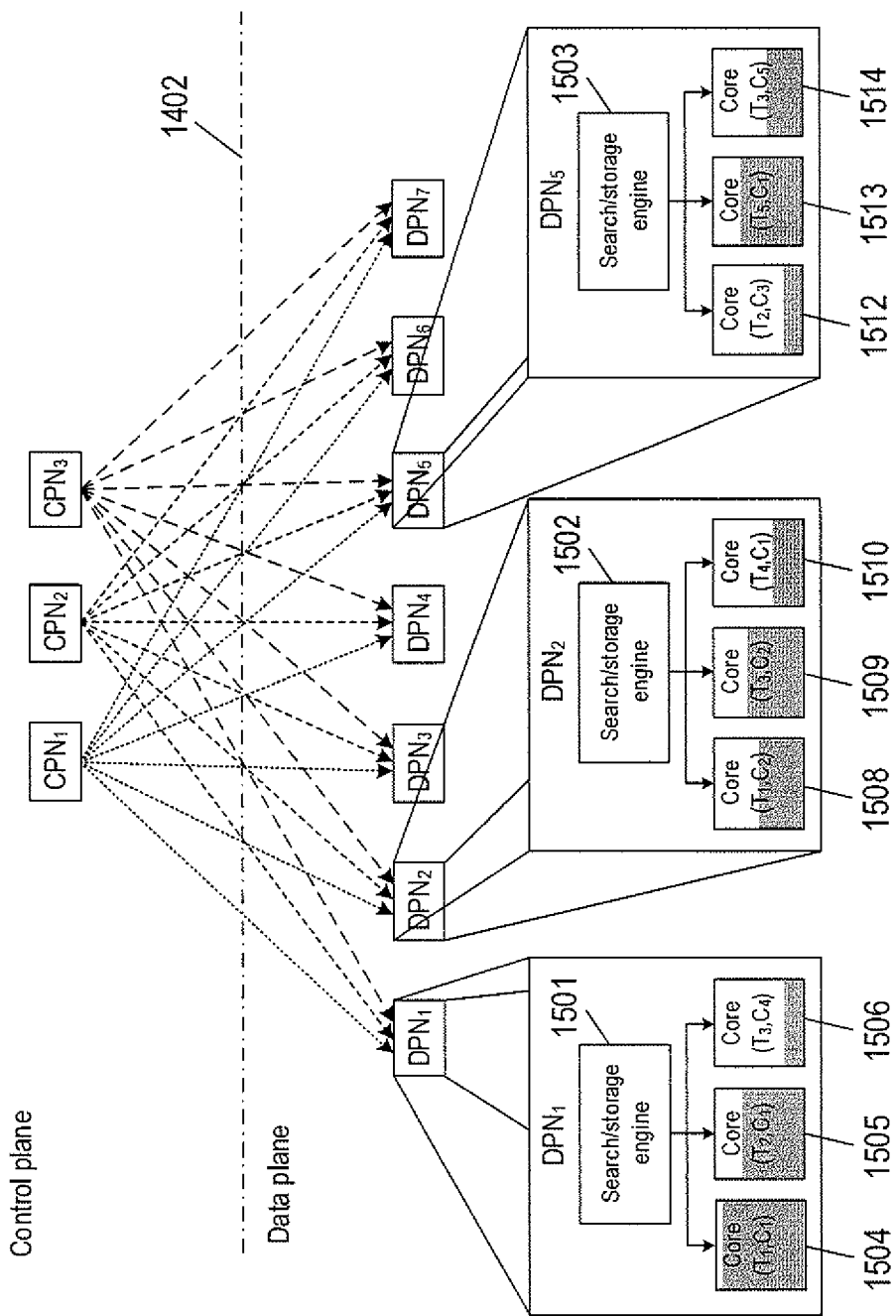
FIG. 15 shows an example configuration of three data plane nodes.

FIG. 15 shows search/storage engines and data cores of tenant data managed by three data plane nodes. In the example of FIG. 15, the data plane nodes $DPN_1$, $DPN_2$, and $DPN_5$ include search/storage engines 1501, 1502, and 1503, respectively. Data plane node $DPN_1$ includes data cores 1504-1506. Data plane node $DPN_2$ includes data cores 1508-1510. Data plane node $DPN_5$ includes data cores 1512-1514. Each data core comprises data that belongs to a tenant, is stored in a hard drive of a server computer or a data-storage device, and is inaccessible by other tenants. A data core comprises isolated data of a tenant, a shard of a multitenant database, or an isolated portion of a horizontally partitioned multitenant database. Each data core is denoted by $(T_m, C_n)$, where $T_m$ denotes the m-th tenant that owns the data stored in the n-th data core denoted by $C_n$. For example, data plane nodes $DPN_1$ and $DPN_2$ manage operation requests on tenant $T_1$ data stored in corresponding data cores $(T_1, C_1)$ 1504 and $(T_1, C_2)$ 1508. The search/storage engines 1501-1503 execute search and storage request from the control plane nodes. For example, control plane node $CPN_1$ may request storage of tenant $T_1$ data in data core $(T_1, C_1)$ 1504.

Figure 16:
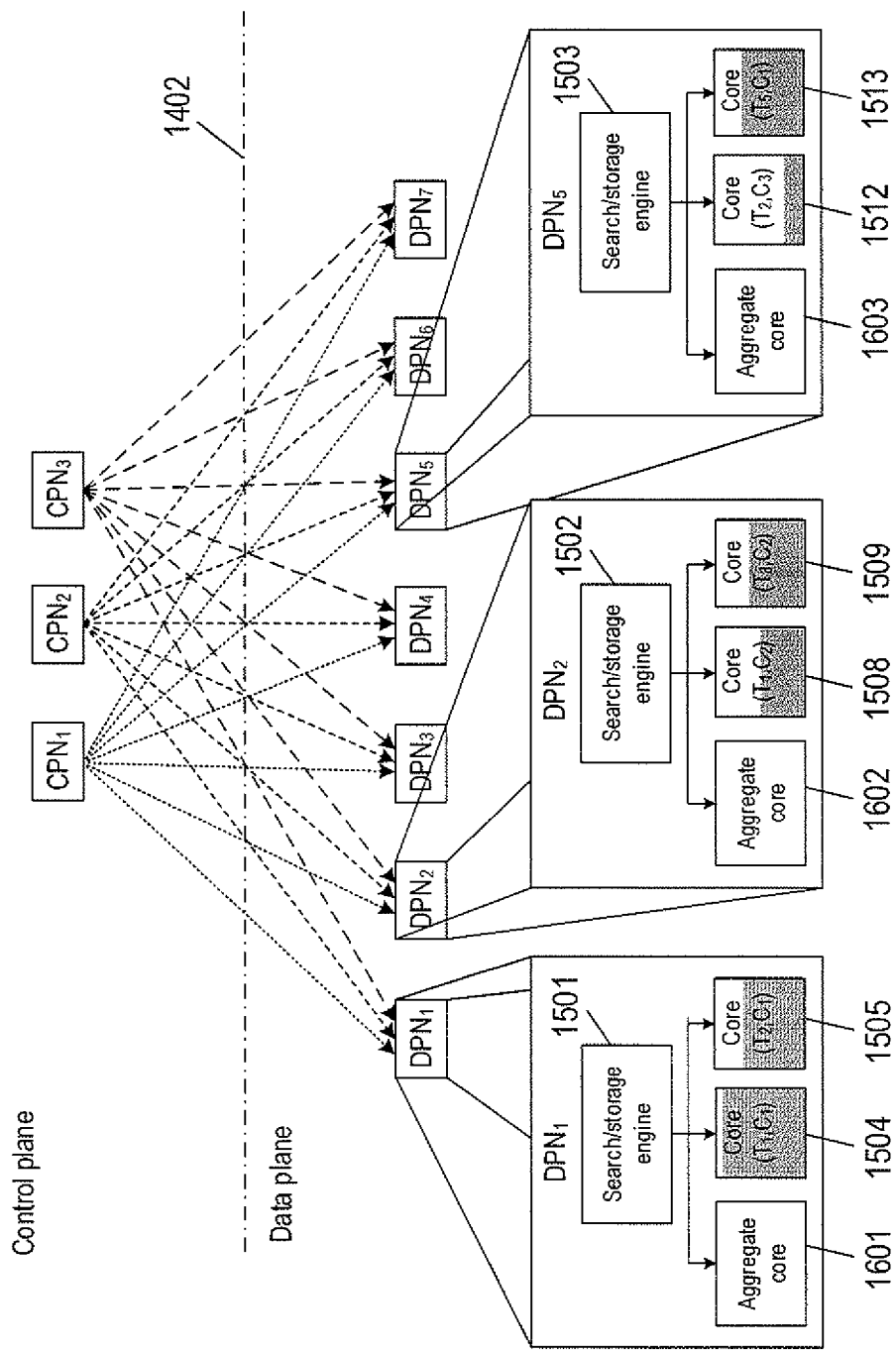
FIG. 16 shows examples of aggregate cores of three data plane nodes.

Each data plane node includes an aggregate core that temporarily buffers the data to be stored in the data cores of the data plane node and coordinates operations and responses across multiples data cores and data plane nodes. FIG. 16 shows examples of aggregate cores 1601-1603 of the data plane nodes $DPN_1$, $DPN_2$, and $DPN_5$. Each aggregate core temporarily buffers the data to be stored in data cores of the data plane nodes $DPN_1$, $DPN_2$, and $DPN_5$ and the corresponding data cores of the other data plane nodes. For example, the aggregate core 1602 buffers the data to be stored in data cores $(T_1, C_2)$ and $(T_3, C_2)$ of the data plane node $DPN_2$ and coordinates operations and responses across data cores of the other data plane nodes $DPN_1$, $DPN_3$, $DPN_4$, $DPN_5$, $DPN_6$, and $DPN_7$. Each data core records metadata regarding the data stored in the data core. The metadata includes, but is not limited to, identity of the tenant, title, description of the data, who or what created the data, tags, categories, date created, remaining storage capacity, and identities the device or user that can access and/or update the data stored in the data core.

Figure 17A:
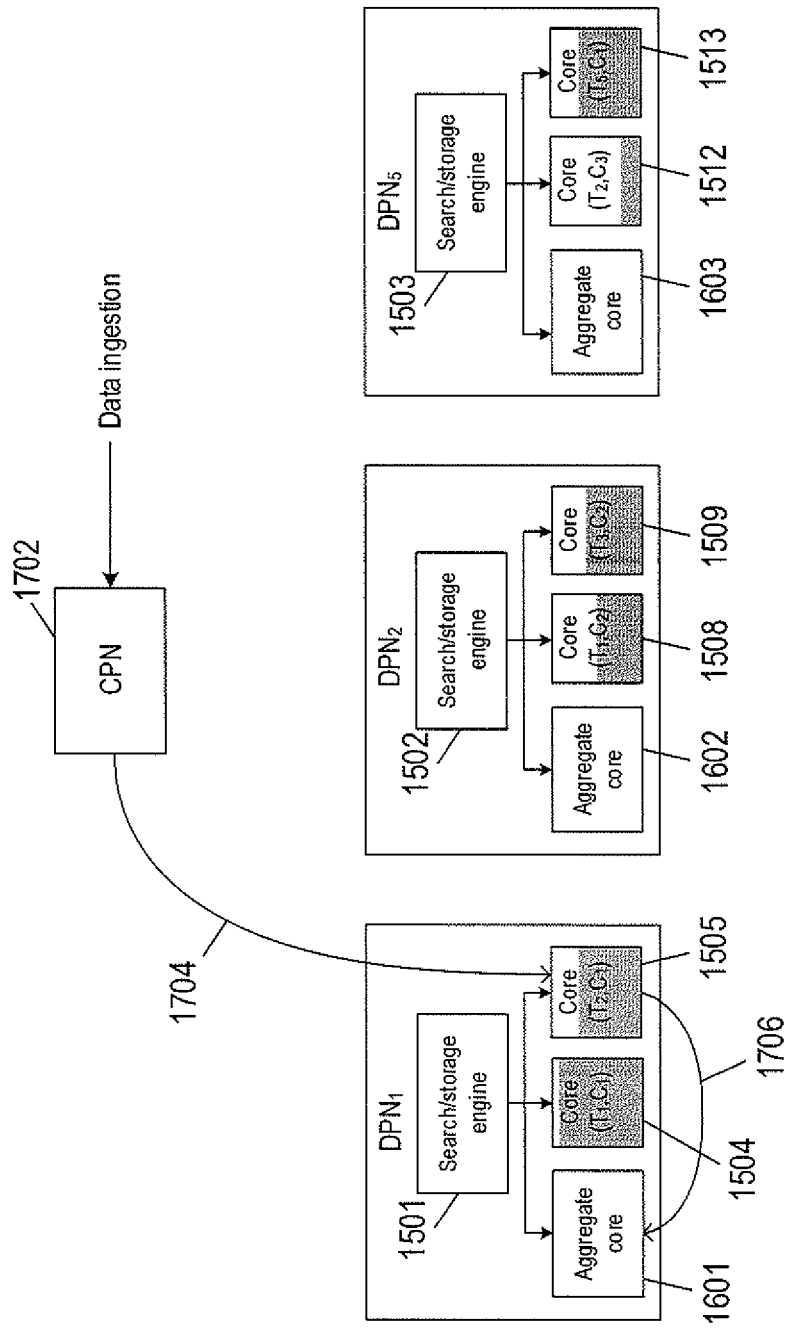
FIGS. 17A-17B show corresponding examples of data ingestion and database querying.
Figure 17B:
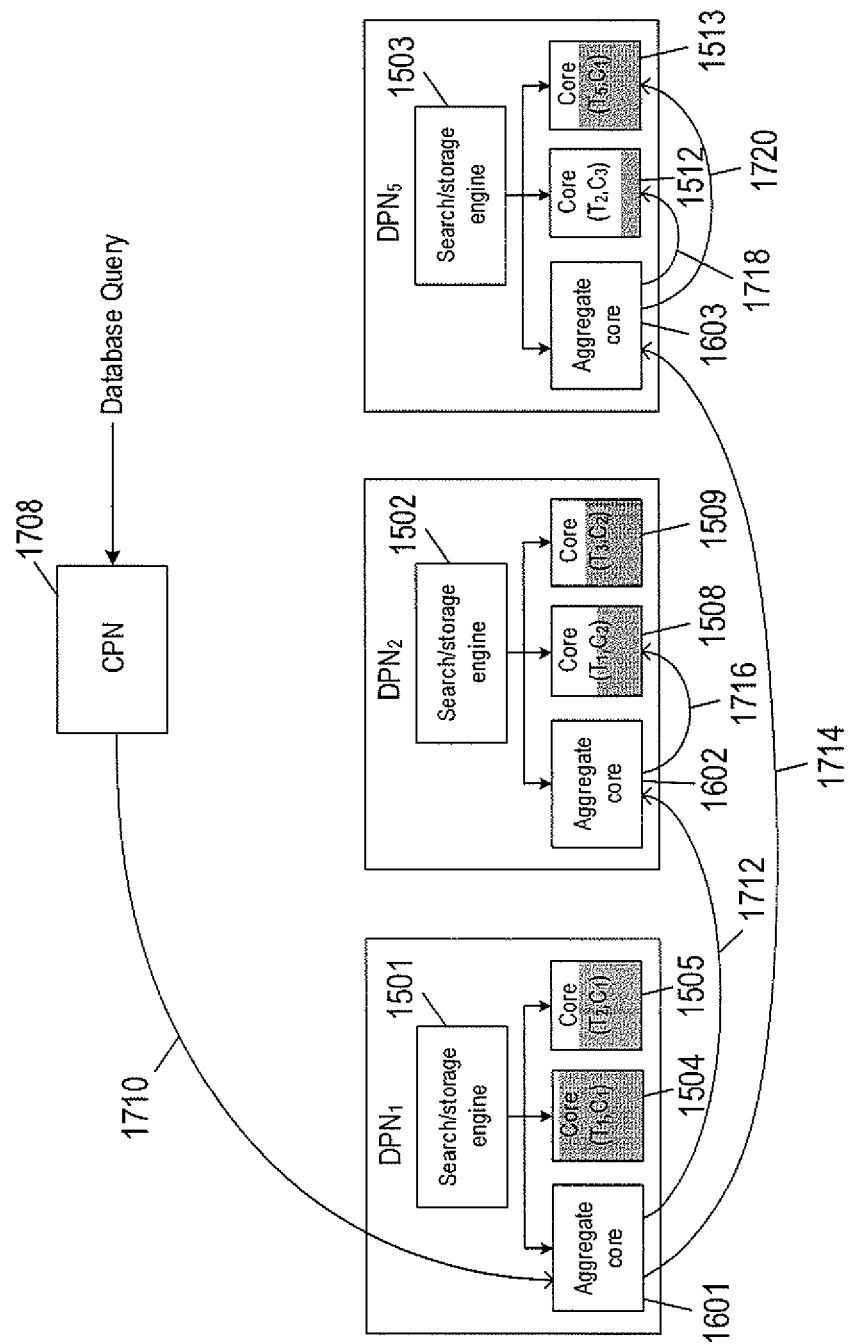

The control plane nodes manage data ingestion by data cores and database queries sent to the data cores. FIGS. 17A-17B show examples of data ingestion and database querying.

In the example of FIG. 17A, a control plane node CPN 1702 receives ingested data for storage in the data core ($T_2$, $C_1$) 1505. The search/storage engine 1501 receives a request from the CPN 1702 to store the data in the data core ($T_2$, $C_1$) 1505. The search/storage engine 1501 stores the data in the data core ($T_2$, $C_1$) 1505 as the data is received from the CPN 1702 as represented by directional arrow 1704. If the volume of the data ingested is greater than the remaining storage capacity of the data core ($T_2$, $C_1$) 1505, the CPN 1702 may create a new data core as a shard of the multitenant database.

In the example of FIG. 17B, a control plane node CPN 1708 receives a database query, such as a query using structured query language ("SQL"). For example, the database query may be an instruction to retrieve data contained in one or more data cores owned by one or more tenants. The CPN 1708 forwards the database query to the aggregate core 1601 as represented by directional arrow 1710. The aggregate core 1601 searches the stored metadata maintained by the data cores to determine if the database query can be answered based on the data stored in the data cores. If the data stored in the data cores managed by the data plane node $DPN_1$ can be used to respond to the database query, the requested data is streamed back to the CPN 1708. If the data cores of the data plane node $DPN_1$ cannot be used to respond to the database query, the aggregate core 1601 forwards the database query to the aggregate cores of the other data base nodes. For example, directional arrows 1712 and 1714 represent forwarding the database query to the aggregate cores 1602 and 1603. In this example, data cores ($T_1$, $C_2$) 1508, ($T_2$, $C_3$) 1512, and ($T_5$, $C_1$) 1513 are queried in response to the database query as represented by directional arrows 1716, 1718, 1720.

Figure 18:
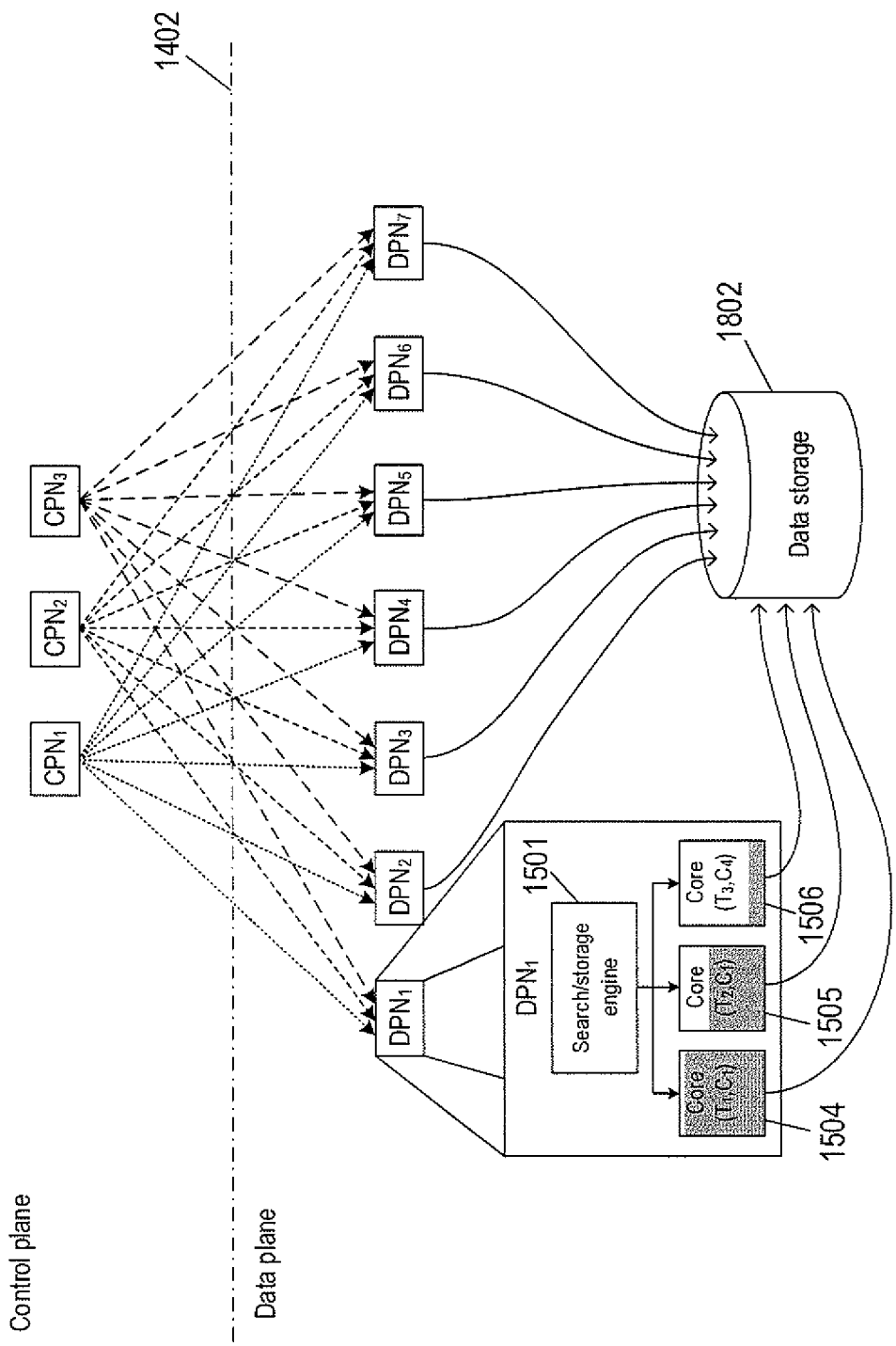
FIG. 18 shows an example data-storage device used to provide backup storage for data cores and data plane nodes.

Each data plane node and data core may be backed up at regular times in a separate tenant database. FIG. 18 shows an example data-storage device used to backup each data core of the data plane nodes. The data in each data core of the data plane nodes are stored separately at regular times to create a backup copy of the data stored in each data core of the data plane nodes. For example, the data in data cores ($T_1$, $C_2$), ($T_2$, $C_1$), and ($T_3$, $C_4$) are stored separately in the data-storage device 1802 at regular times to create a backup copy of the data stored in each data core of the data plane node $DPN_1$.

Methods and systems are directed to detecting failures in data plane nodes and data cores. Failures in data plane nodes and data cores may be the result of a failed network, server computer, hard disk drive, or data-storage device. When a failure in either a data plane node or a data core is detected, the data plane node and data core are localized or isolated from the database management system. Troubleshooting is initiated to correct the failure. Methods to troubleshoot and localize a failed data plane node or failed data core includes (1) detection and notification of the failure, (2) root cause analysis of the failure, (3) recovery, and (4) provide a summary notification, indicating whether recovery is successful or details of potential problems that require intervention by a system administrator.

Data plane node failures are determined by checking the network connection status of each data plane node. The network connection status of each data plane node may be determined by sending a ping to each data plane node at regular time intervals. A ping is a data packet that contains the IP address of the control plane node that sends the ping, the IP address of the data plane node intended to receive the ping, and an echo request. The control plane node records the time, $t_{sent}$, when a ping is sent to a data plane node. Each data plane node includes an echo reply service that responds to an echo request. Ideally, when a data plane node receives a ping, the echo reply service of the data plane node generates an echo reply that is sent from the data plane node to the control plane node. The echo reply may include errors in case of a failure. When a control plane node receives an echo reply, the control plane node records the time, $t_{reply}$, the echo reply is received. If the time difference $t_{reply}-t_{sent}$ is less than an echo reply time limit $t_{max}$ (i.e., $t_{sent} \le t_{reply} \le t_{sent}+t_{max}$), the data plane node is identified as "connected." On the other hand, if the control plane node does not receive an echo reply from a data plane node within an echo reply time interval [$t_{sent}$, $t_{sent}+t_{max}$], the data plane node is identified as "disconnected." In other words, if an echo reply is not received from a data plane node before the time $t_{sent}+t_{max}$ has elapsed, the data plane node is identified as "disconnected."

Figure 19:
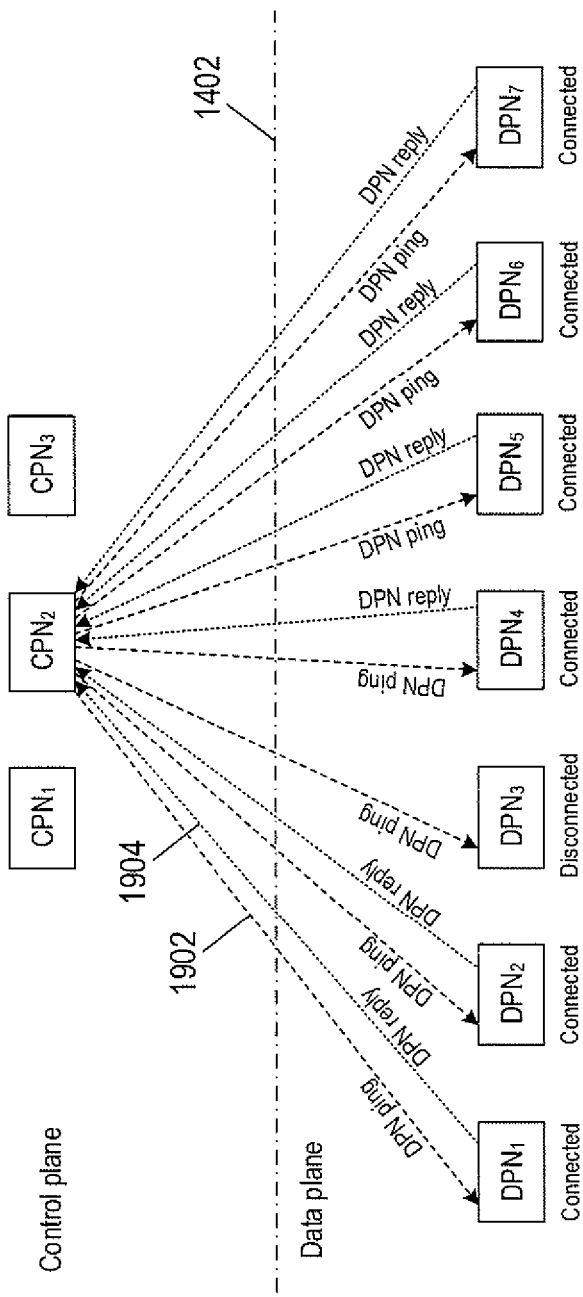
FIG. 19 shows an example of data plane node pings sent from a control plane node to data plane nodes.

FIG. 19 shows an example of data plane node ("DPN") pings sent from the control plane node $CPN_2$ to each of the data plane nodes $DPN_1$, $DPN_2$, $DPN_3$, $DPN_4$, $DPN_5$, $DPN_6$, and $DPN_7$. DPN pings sent from the control plane node $CPN_2$ are represented by dashed-line directional arrows, such as dashed line directional arrow 1902. Except for data plane node $DPN_3$, each of the data plane nodes sends a DPN reply to the $CPN_2$. DPN replys are represented by dotted-line directional arrows, such as dashed line dotted-line directional arrow 1904. The control plane node $CPN_2$ determines whether the time each echo reply is received is within the echo reply time interval. In the example of FIG. 19, DPN replies are sent from the data plane nodes $DPN_1$, $DPN_2$, $DPN_3$, $DPN_4$, $DPN_5$, $DPN_6$, and $DPN_7$ to the control plane node $CPN_2$. The data plane nodes $DPN_1$, $DPN_2$, $DPN_3$, $DPN_4$, $DPN_5$, $DPN_6$, and $DPN_7$ are each identified as "connected." However, a DPN reply is not sent from the data plane node $DPN_3$ to the control plane node $CPN_2$. As a result, data plane node $DPN_3$ is identified as "disconnected."

When a data plane node network connection status check reveals a data plane node is disconnected (i.e., not connected to the network), the configuration of the data cores of the disconnected data plane node are identified as "unavailable" to prevent further attempts to store data at the data cores. When a data plane node network connection status check reveals a data plane node is connected to the network, the configuration of the data cores of the connected data plane node are fetched and an availability status check is performed on each data core of the connected data plane node. The configuration of the data cores is control data stored in the control plane nodes. The control data of a data core contains information, such as a universal unique identifier or identification of the data core, status, size, and max size of the data core, and identification of the tenant that owns the data core, the data plane node that maintains the data core, and timestamp of the last check of the data core. Each control plane node uses the control data to query the data core and use identifiers to invoke application program interface ("API") on the data plane node. The control plane nodes check the availability status of the data cores by performing a series of availability status checks on each data core:

(1) A first availability status check may be executed by sending a data core ping from a ping API running in the control plane node to each data core of a connected data plane node. A data core ping is a data packet that contains the IP address of the control plane node that sends the ping, the IP address of the data core intended to receive the ping, and an echo request. The control plane node records the time, $t_{sent}$, when a data core ping is sent to a data core. Each data core includes an echo reply service that responds to the echo request. Ideally, when a data care receives a ping, the echo reply service of the data core uses the IP address of the control plane node to generate an echo reply that is sent from the data core to the control plane node. When a control plane node receives an echo reply, the control plane node records the time, $t_{reply}$, the echo reply is received. If an echo reply is not received from the data core before a reply time limit denoted by $t_{sent}+t_{max}$ has elapsed, the data core is identified as "unavailable." The details are recorded in a log summary for the data core. If an echo reply is received from a data core before the time $t_{sent}+t_{max}$ has elapsed, the process may flow to a second status check.

(2) The second availability status check is a check for an initialization failure of the data core. The data core is loaded before the data can be used by applications that ingest the data or query the data. During the process of loading a data core configuration of the data stored in the data core into memory there may be failures to parse the configuration data, such as incomplete metadata or location of data in the data core, which creates an initialization failure. The ping API returns an initialization failure if the control data or data stored in the data core failed to load. If the data core is identified as having an initialization failure, the data core is identified as "unavailable." If no initialization failure is detected, the process may flow to a third status check.

(3) The third availability status check is a check for a corrupted index. If the index is corrupted, then the data core is identified as "unavailable." Corrupted index may be identified by using a hash function that maps data of a data core to an index. A current index is compared with a previously generated index for the data core. If the indices disagree, the current index is a corrupted index and the corresponding data core is assumed corrupted due to tampering, corruption of the disk used to store the data core, or due to a failed disk write operation.

When a data core passes the three availability status checks, the data core is identified as "available." On the other hand, when the data core fails one of the availability status checks, the data core is identified as "unavailable." The availability status checks are performed by the control plane nodes on the data plane nodes using APIs and custom APIs.

Figure 20:
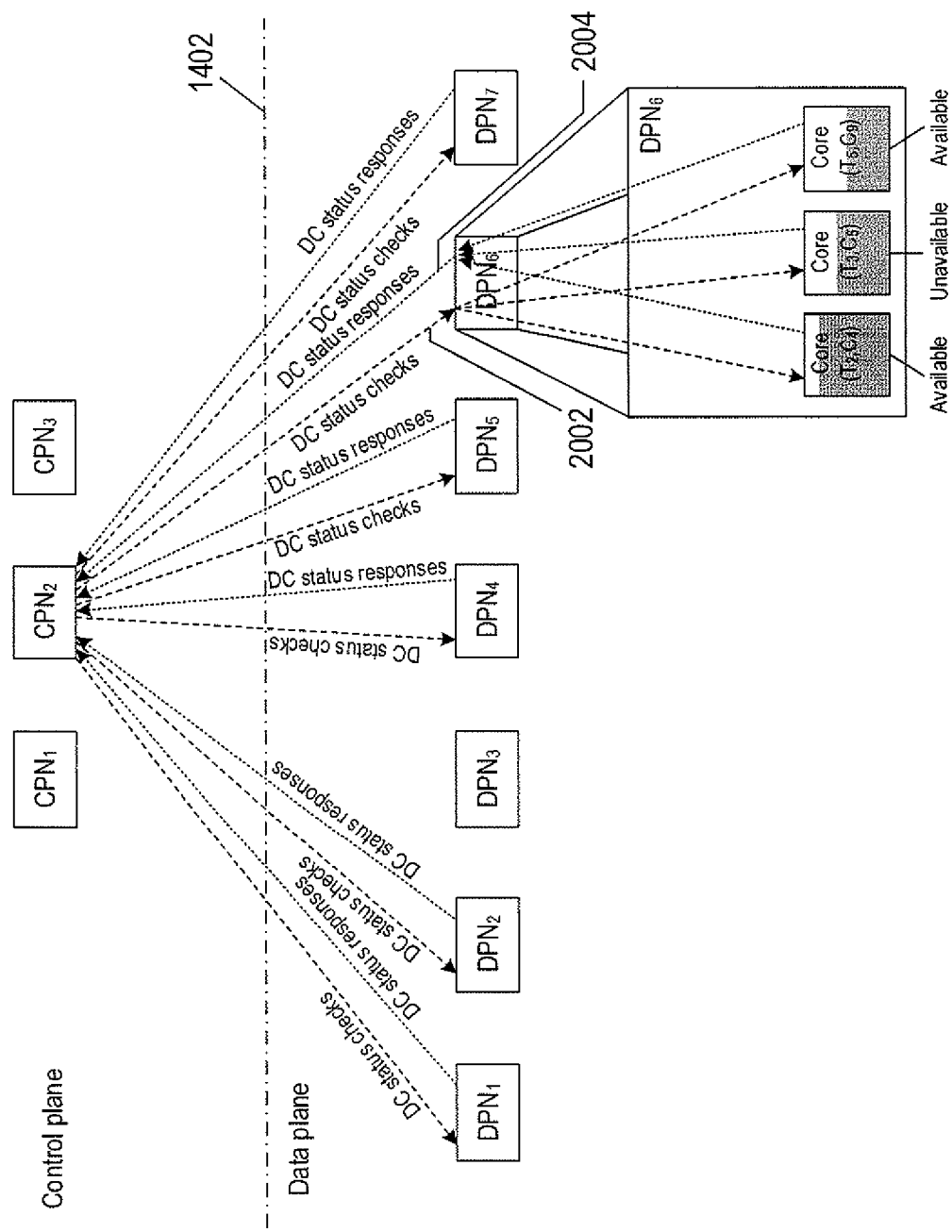
FIG. 20 shows an example of data core availability status checks sent from a control plane node to data plane nodes.

FIG. 20 shows an example of data core status checks sent from the control plane node $CPN_2$ to each of the data plane nodes $DPN_1$, $DPN_2$, $DPN_3$, $DPN_4$, $DPN_5$, $DPN_6$, and $DPN_7$. Data core availability status checks are represented by dashed-line directional arrows, such as dashed line directional arrow 2002. Because the data plane node $DPN_3$ has been identified as "disconnected," data core availability status checks are not sent to data cores of the data plane node $DPN_3$. Dotted-line directional arrows, such as dotted-line directional arrow 2004, represent status responses sent from the data cores of the connected data plane nodes to the control plane node $CPN_2$. When a data core passes all three of the availability status checks, the control plane node $CPN_2$ identifies the data core as "available." When any one of the status checks of a data core fails, the control plane node $CPN_2$ identifies the data core as "unavailable." For example, data cores $(T_2, C_4)$ and $(T_5, C_9)$ have passed the three availability status checks and been identified as "available." Data core $(T_3, C_5)$ has been identified as "unavailable." The data core $(T_3, C_5)$ may have failed to send an echo reply within an echo reply time interval. The data core $(T_3, C_5)$ may have failed an initialization test or has a corrupted index.

When a data plane node fails to pass a data plane node connection status check and is identified as "disconnected," the data plane node is excluded from data ingestion and data queries and the $CPN_2$ generates an alert notifying a system administrator of the data plane node failure. Data ingestion and data queries may be executed with the backup cores of the disconnected data plane node. The system administrator may try to revive the node and execute a recovery to restore all nodes from backup storage. Alternatively, methods may include script files that automatically execute recovery of a data plane node from backup copies of the data cores without any intervention from a system administrator. For example, the data cores are self-contained. As a result, when a data plane node fails, the corresponding data cores may be restored from the backup on other healthy data plane nodes. Once the data cores are restored on other data plane nodes, the failed data plane node may destroyed to release the computational resources associated with the failed data plane node.

When a data core fails to pass any one of the availability status checks and is identified as "unavailable," the data core is excluded from data ingestion and data queries and the $CPN_2$ generates an alert notifying a system administrator of the data core failure. Data ingestion and data queries may be executed with the backup core. The system administrator may try to revive the data core and execute a recovery to restore all nodes from backup storage. Alternatively, methods may include script files that automatically execute recovery of a data core from a backup copy of the data core without any intervention from a system administrator.

Control plane nodes route data ingestion and query requests to data plane nodes and orchestrate the process by providing high availability with control plane node data replicated and distributed across the control plane nodes. If a control plane node fails, the application will continue to run without issue. If all control plane nodes fail, then the services and operations cannot continue. New control plane nodes can be dynamically added or removed from a control plane. When a control plane node is added or removed, the control plane node configuration data is rebalanced and replicated based on the control plane nodes that are available. A replication factor that represents the number of control plane node failure can be used to decide how many control plane node failures can be tolerated at a given point in time. If the number of control plane node failures is greater than the replication factor, the application services are discontinued.

A disconnected data plane node or an unavailable data core may be caused by a failure of network devices that send data to and from the server computer, VM, or container used to run the data plane node or the data core. A disconnected data plane node may be caused by a failure of the VM, container, or server computer that host the data plane node. An unavailable data plane node may be caused by corrupted core data or a failure of the VM, container, server computer that host the data plane node. Automated recovery may include restarting network devices, VMs, containers, and server computers associated with the data plane node. If a disconnected data plane node remains disconnected after restart remedies have been executed, the data plane node may be destroyed and recreated in another VM, container, or on a different server computer within the distributed computing system from the backup data cores. If an unavailable data core remains unavailable after restart remedies have been executed, the data core may be reloaded or destroyed and recreated in another VM, container, or on a different server computer within the distributed computing system from the backup data cores.

Figure 21:
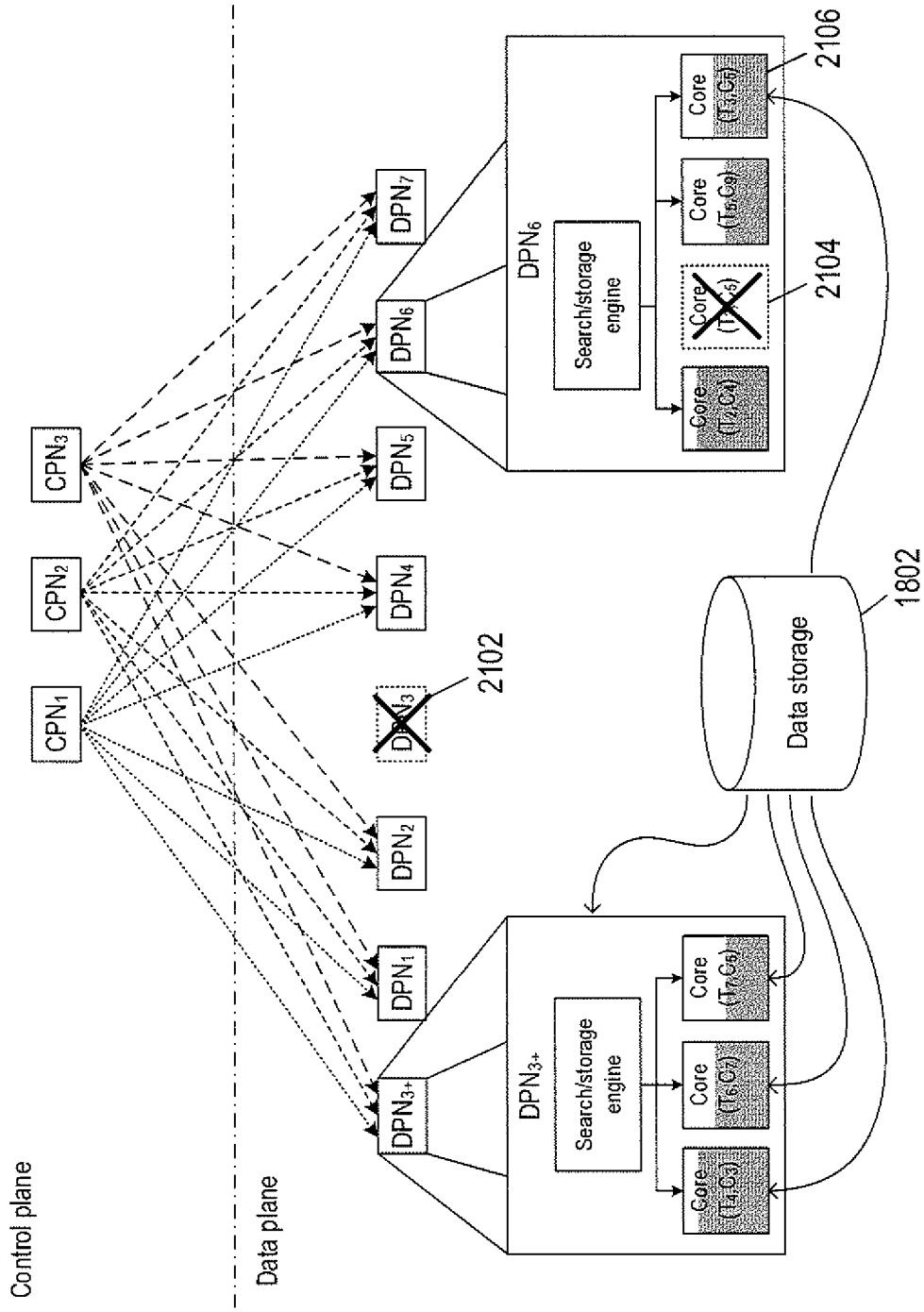
FIG. 21 shows an example of a recreated data plane node and a recreated data core.

FIG. 21 shows an example of a recreated data plane node and a recreated data core. As described above with reference to FIG. 19, the data plane node $DPN_3$ failed to satisfy a connection status check and is identified as "disconnected." In FIG. 21, $DPN_3$ is marked with an "X" 2102, indicating that the $DPN_3$ has been destroyed and is no longer available to ingest data and receive data queries. The data plane node $DPN_3$ may be destroyed by deleting the VM or container the data plane node $DPN_3$ runs in. The data plane node is recreated as data plane node $DPN_{3+}$ in a different VM, container, or on a different server computer. The data cores of the recreated data plane node $DPN_{3+}$ may be restored from copies of the data cores maintained in the data storage 1802. As described above with reference to FIG. 20, the data core $(T_3, C_5)$ failed to satisfy one of the availability status checks and is identified as "unavailable." In FIG. 21, the data core $(T_3, C_5)$ is marked with an "X" 2104, indicating that the data core $(T_3, C_5)$ has been destroyed and is no longer available to ingest data and receive data queries. The data core $(T_3, C_5)$ may have been destroyed by deleting the data core from the server computer followed by recreating data core $(T_3, C_5)$ 2106 on the same or a different VM, container, or on a different server computer from a copy of the data cores maintained in the data storage 1802.

The methods described below with reference to FIGS. 22-25 are stored in one or more data-storage devices as machine-readable instructions that when executed by one or more processors of the computer system shown in FIG. 1 to manage resource utilization in a distributed computing system.

Figure 22:
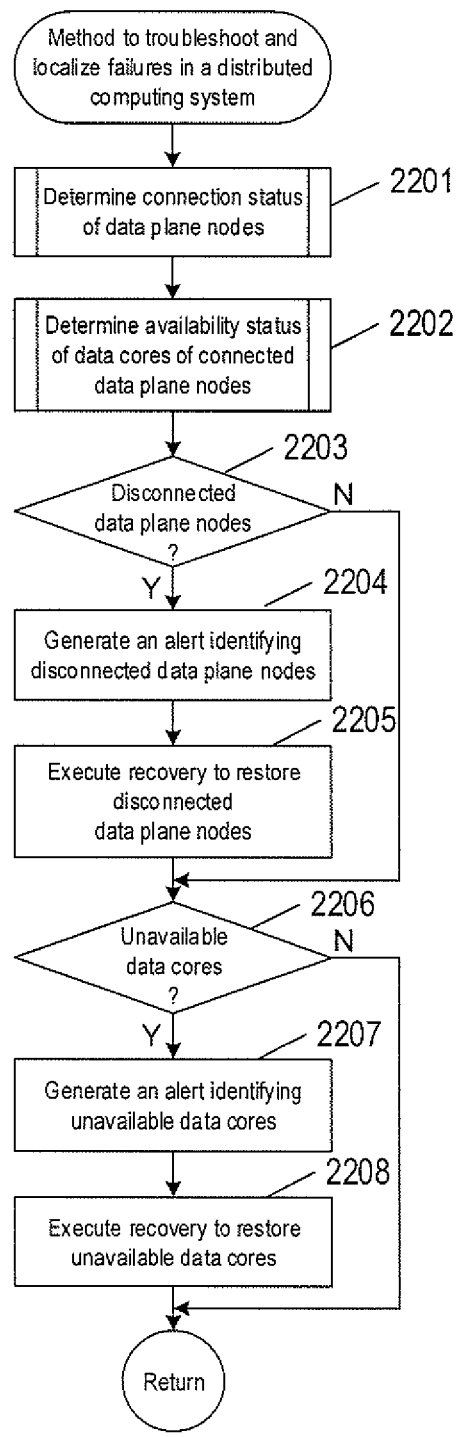
FIG. 22 shows a control-flow diagram of a method to troubleshoot and localize failures in a distributed computing system.

FIG. 22 shows a control-flow diagram of a method to troubleshoot and localize failures in a distributed computing system. In block 2201, a routine "determine connection status of data plane nodes" is called. In block 2202, a routine "determine availability status of data cores of connected data plane nodes" is called. In decision block 2203, when disconnected data plane nodes are discovered in block 2201, control flow to block 2204. In block 2204, an alert is generated on a system administration console identifying disconnected data plane nodes. In block 2205, recovery to restore disconnected data plane nodes is executed. Recovery may be carried out by restarting network devices, VMs, containers, and server computers used to run the data plane nodes. Recovery may also include destroying the disconnected data plane nodes and recreating the data plane nodes in different VMs, containers, and server computers from the data core backups. In decision block 2206, when unavailable data cores are discovered in block 2202, control flow to block 2207. In block 2207, an alert is generated on a system administration console identifying unavailable data cores. In block 2208, recovery to restore unavailable data cores is executed. Recovery may be carried out by restarting network devices, VMs, containers, and server computers used to run the data plane nodes. Recovery may also include destroying the unavailable data cores and recreating the data cores in different VMs, containers, and server computers from the data core backups.

Figure 23:
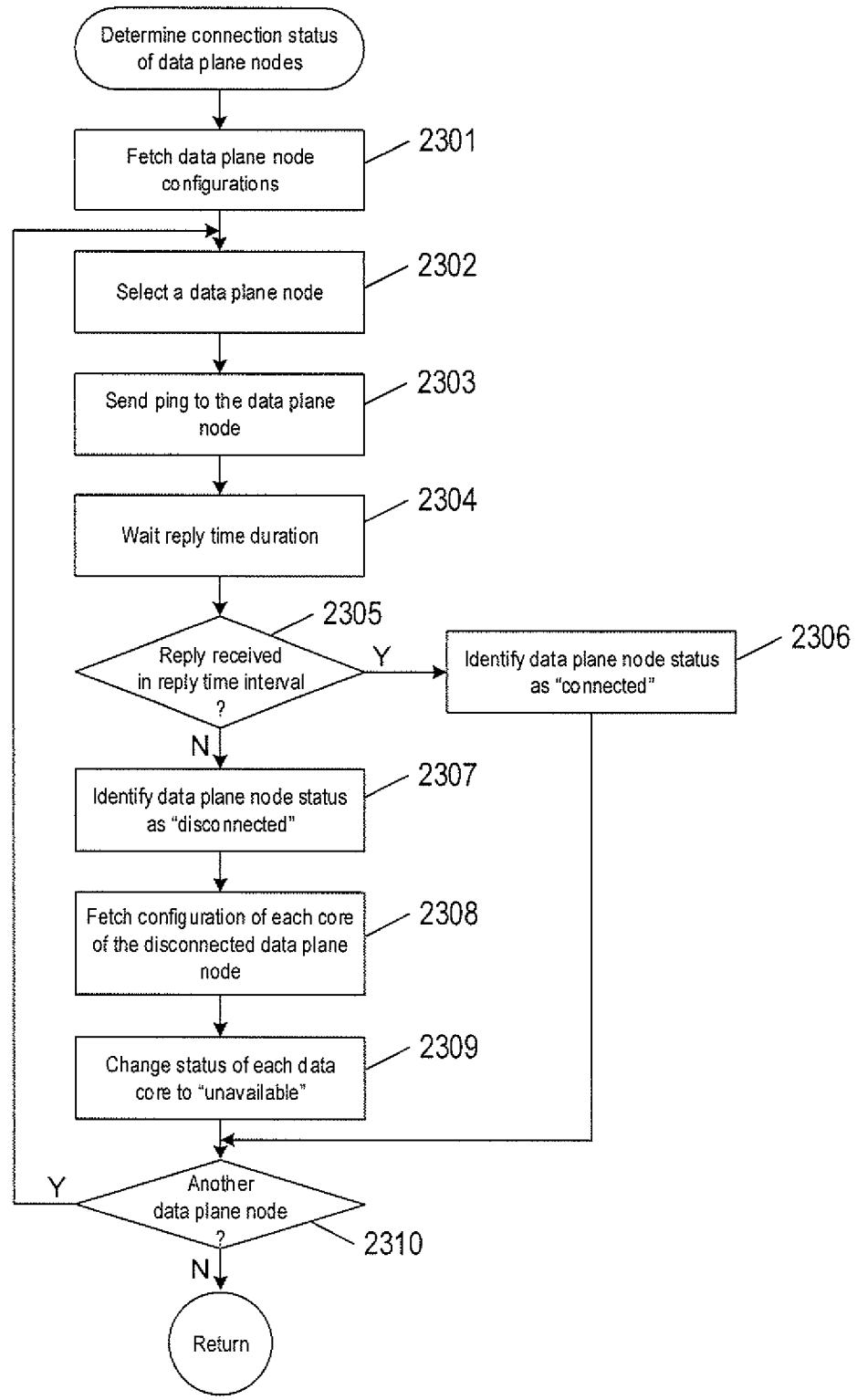
FIG. 23 shows a control-flow diagram of the routine "determine connection status of data plane nodes" called in FIG. 22.

FIG. 23 shows a control-flow diagram of the routine "determine connection status of data plane nodes" called in block 2201 of FIG. 22. In block 2301, data plane node configurations are fetched. In block 2302, a data plane node is selected. In block 2303, a ping is sent to the data plane node as described above with reference to FIG. 19. In block 2304, wait the duration of an echo reply time interval for an echo reply from the data plane node. In decision block 2305, when the echo reply falls with the echo reply time interval, control flows to block 2306. When the echo reply is not received from the data plane node before the echo reply time interval expires, control flows to block 2307. In block 2306, the data plane node connection status is identified as "connected." In block 2307, the data plane node connection status is identified as "disconnected." In block 2308, configuration of each data core of the disconnected data plane node are fetched. In block 2309, availability status of each data core is changed to "unavailable." In decision block 2310, the operations of blocks 2302-2309 are repeated for another data plane node.

Figure 24:
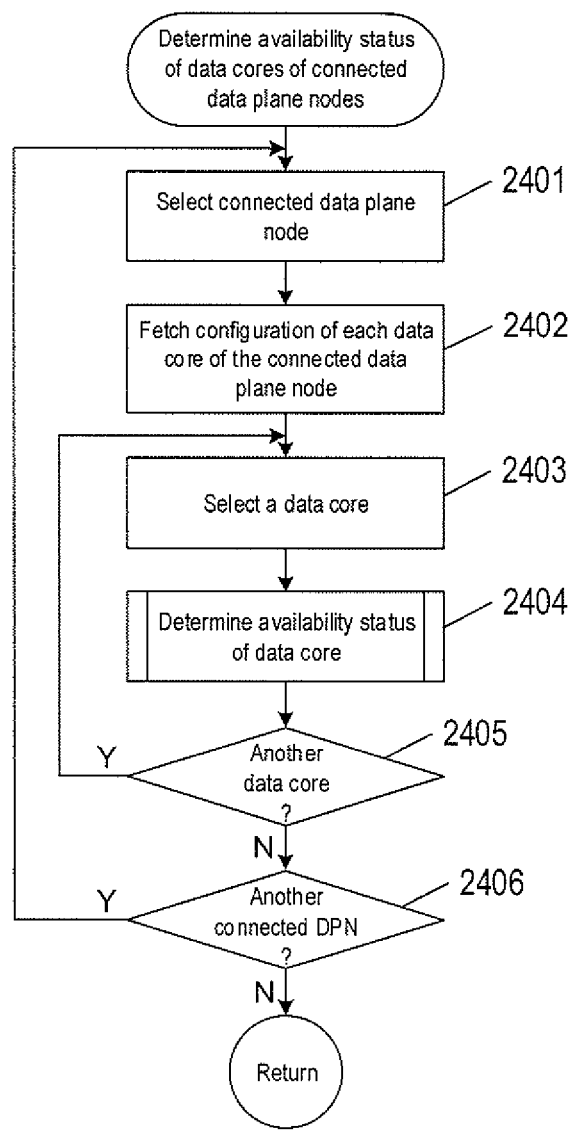
FIG. 24 shows a control-flow diagram of the routine "determine availability status of data cores of connected data plane nodes" called in FIG. 22.

FIG. 24 shows a control-flow diagram of the routine "determine availability status of data cores of connected data plane nodes" called in block 2202 of FIG. 22. In block 2401, a connected data plane node is selected. In block 2402, the configuration of each data core of the connected data plane node is fetched. In block 2403, a data core of the connected data plane node is selected. In block 2404, a routine "determine availability status of data core" is called. In decision block 2405, the operations represented by blocks 2403-2404 are repeated for another data core. In decision block 2406, the operations represented by blocks 2401-2405 are repeated for another connected data plane node.

Figure 25:
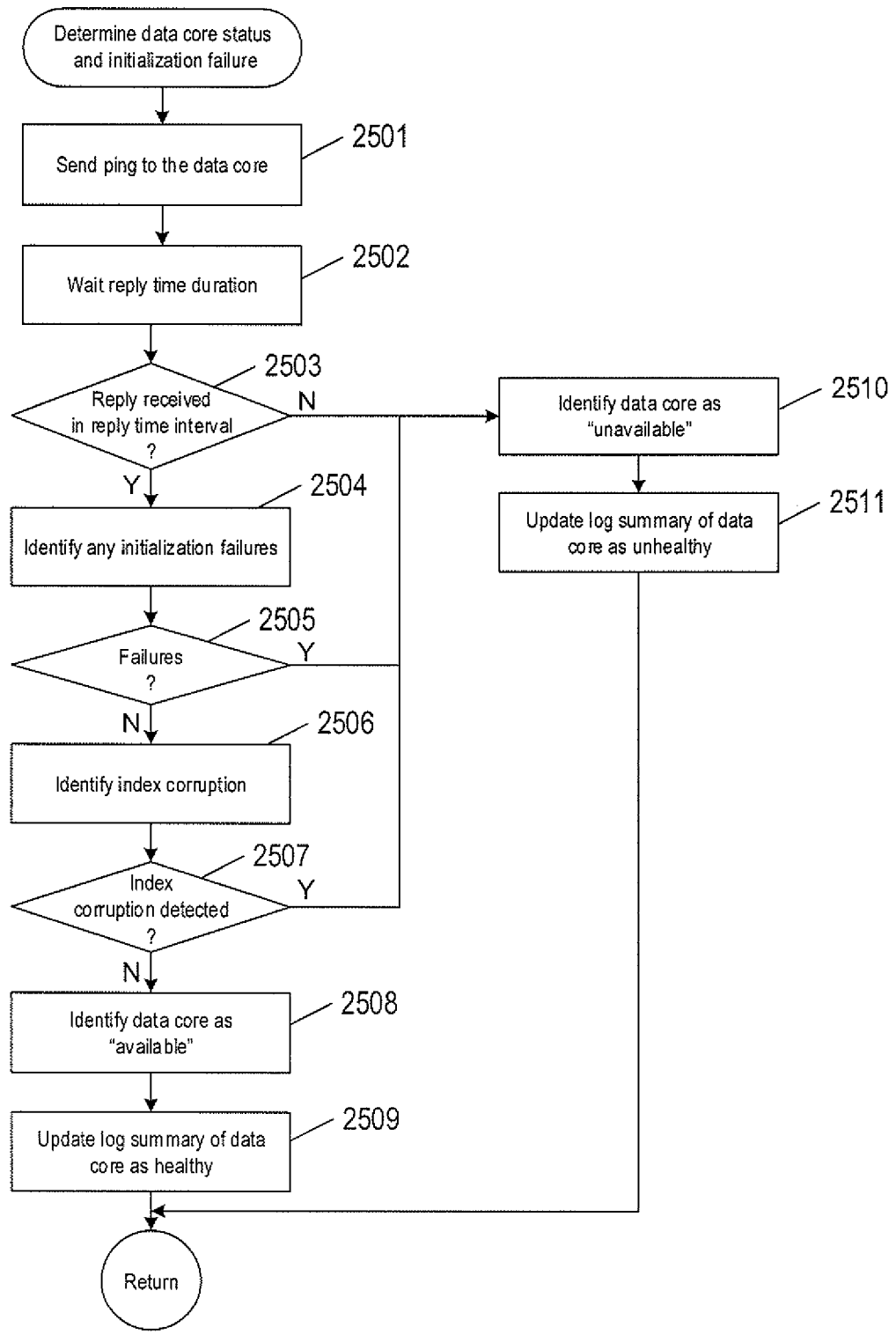
FIG. 25 shows a control-flow diagram of the routine "determine availability status of data core" called in FIG. 24.

FIG. 25 shows a control-flow diagram of the routine "determine availability status of data core" called in block 2304 of FIG. 24. In block 2501, a ping is sent to the data core as described above with reference to FIG. 19. In block 2502, wait the duration of an echo reply time interval for an echo reply from the data core. In decision block 2503, when the echo reply falls with the echo reply time interval, control flows to block 2504. When the echo reply is not received from the data core before the echo reply time interval expires, control flows to block 2510. In block 2504, initialization failures of the data core are identified. In decision block 2505, when initialization failures have been detected in the data core, control flows to block 2510. Otherwise, control flows to block 2506. In block 2506, the data core is searched for index corruption. In decision block 2507, when index corruption has been identified in the data core, control flows to block 2510. Otherwise, control flows to block 2508. In block 2508, the data core is identified as "available" to ingest data. In block 2509, the log summary of the data core is updated to indicate that the data core is available and healthy. In block 2508, the data core is identified as "unavailable" to ingest data. In block 2509, the log summary of the data core is updated to indicate that the data core is unavailable and unhealthy.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to troubleshoot and localize failures in data storage of a multitenant application run in a distributed computing system, the process comprising:
   determining network connection status for each data plane node of a database management system for a multitenant database, each data plane node having one or more data cores;
   determining availability status of the one or more data cores of each connected data plane node;
   isolating the one or more data cores of each disconnected data plane node from data storage ingestion and data queries;
   isolating unavailable data cores of each connected data plane node from data storage ingestion and data queries; and
   executing recovery to restore the disconnected data plane nodes to receive data storage request and queries from control plane nodes and restore the unavailable data cores to ingest data and respond to data queries.

2. The process of claim 1 wherein determining the network connection status for each data plane node comprises:
   sending pings that include echo requests from one or more control plane nodes to each of the data plane nodes;
   for each data plane node, when the data plane node sends an echo reply to the sending control plane node in response to receiving the echo request within a reply time limit, identifying the data plane node as network connected; and
   for each data plane node, when a data plane node fails to send an echo reply to the sending control plane node in response to receiving the echo request within the reply time limit, identifying the data plane node as network disconnected.

3. The process of claim 1 wherein determine availability status of the one or more data cores of each connected data plane node comprises:
   sending pings that include echo requests from one or more control plane nodes to each data core of the connected data plane nodes;
   when the data core sends an echo reply to the sending control plane node in response to receiving the echo request within a reply time limit, identifying the data core as available; and
   when a data core fails to send an echo reply to the sending control plane node within the reply time limit, identifying the data core as unavailable.

4. The process of claim 1 wherein determining availability status of the one or more data cores of each connected data plane node comprises identifying the data cores as unavailable when data of the data core fails to load data into memory.

5. The process of claim 1 wherein determining availability status of the one or more data cores of each connected data plane node comprises:
   for each data core mapping data of the data core to an index;
   comparing the index of each data core with a previously generated index for the data core; and
   for each data core identifying the data core as unavailable, when the index and the previously generated index disagree.

6. The process of claim 1 wherein executing recovery to restore the disconnected data plane nodes comprises at least one of restarting devices associated with the disconnected data plane nodes and destroying the data plane node followed by recreating the data plane nodes in another virtual object or server computer.

7. The process of claim 1 wherein executing recovery to restore the unavailable data cores comprises at least one of restarting devices associated with the disconnected data cores and destroying the data cores followed by recreating the data cores in one or more data plane nodes.

8. A computer system to troubleshoot and localize failures in data storage of a multitenant application run in a distributed computing system in a distributed computing system, the system comprising:
   one or more processors;
   one or more data-storage devices; and
   machine-readable instructions stored in the one or more data-storage devices that when executed using the one or more processors controls the system to carry out
      determining network connection status for each data plane node of a database management system for a multitenant database, each data plane node having one or more data cores;
      determining availability status of the one or more data cores of each connected data plane node;
      isolating the one or more data cores of each disconnected data plane node from data storage ingestion and data queries;
      isolating unavailable data cores of each connected data plane node from data storage ingestion and data queries; and
      executing recovery to restore the disconnected data plane nodes to receive data storage request and queries from control plane nodes and restore the unavailable data cores to ingest data and respond to data queries.

9. The system of claim 8 wherein determining the network connection status for each data plane node comprises:
   sending pings that include echo requests from one or more control plane nodes to each of the data plane nodes;
   for each data plane node, when the data plane node sends an echo reply to the sending control plane node in response to receiving the echo request within a reply time limit, identifying the data plane node as network connected; and
   for each data plane node, when a data plane node fails to send an echo reply to the sending control plane node in response to receiving the echo request within the reply time limit, identifying the data plane node as network disconnected.

10. The system of claim 8 wherein determine availability status of the one or more data cores of each connected data plane node comprises:
    sending pings that include echo requests from one or more control plane nodes to each data core of the connected data plane nodes;
    when the data core sends an echo reply to the sending control plane node in response to receiving the echo request within a reply time limit, identifying the data core as available; and
    when a data core fails to send an echo reply to the sending control plane node within the reply time limit, identifying the data core as unavailable.

11. The system of claim 8 wherein determining availability status of the one or more data cores of each connected data plane node comprises identifying the data cores as unavailable when data of the data core fails to load data into memory.

12. The system of claim 8 wherein determining availability status of the one or more data cores of each connected data plane node comprises:
for each data core mapping data of the data core to an index;
comparing the index of each data core with a previously generated index for the data core; and
for each data core identifying the data core as unavailable, when the index and the previously generated index disagree.

13. The system of claim 8 wherein executing recovery to restore the disconnected data plane nodes comprises at least one of restarting devices associated with the disconnected data plane nodes and destroying the data plane node followed by recreating the data plane nodes in another virtual object or server computer.

14. The system of claim 8 wherein executing recovery to restore the unavailable data cores comprises at least one of restarting devices associated with the disconnected data cores and destroying the data cores followed by recreating the data cores in one or more data plane nodes.

15. A non-transitory computer-readable medium encoded with machine-readable instructions that implement a method carried out by one or more processors of a computer system to perform the operations of
determining network connection status for each data plane node of a database management system for a multi-tenant database, each data plane node having one or more data cores;
determining availability status of the one or more data cores of each connected data plane node;
isolating the one or more data cores of each disconnected data plane node from data storage ingestion and data queries;
isolating unavailable data cores of each connected data plane node from data storage ingestion and data queries; and
executing recovery to restore the disconnected data plane nodes to receive data storage request and queries from control plane nodes and restore the unavailable data cores to ingest data and respond to data queries.

16. The medium of claim 15 wherein determining the network connection status for each data plane node comprises:
sending pings that include echo requests from one or more control plane nodes to each of the data plane nodes;
for each data plane node, when the data plane node sends an echo reply to the sending control plane node in response to receiving the echo request within a reply time limit, identifying the data plane node as network connected; and
for each data plane node, when a data plane node fails to send an echo reply to the sending control plane node in response to receiving the echo request within the reply time limit, identifying the data plane node as network disconnected.

17. The medium of claim 15 wherein determine availability status of the one or more data cores of each connected data plane node comprises:
sending pings that include echo requests from one or more control plane nodes to each data core of the connected data plane nodes;
when the data core sends an echo reply to the sending control plane node in response to receiving the echo request within a reply time limit, identifying the data core as available; and
when a data core fails to send an echo reply to the sending control plane node within the reply time limit, identifying the data core as unavailable.

18. The medium of claim 15 wherein determining availability status of the one or more data cores of each connected data plane node comprises identifying the data cores as unavailable when data of the data core fails to load data into memory.

19. The medium of claim 15 wherein determining availability status of the one or more data cores of each connected data plane node comprises:
for each data core mapping data of the data core to an index;
comparing the index of each data core with a previously generated index for the data core; and
for each data core identifying the data core as unavailable, when the index and the previously generated index disagree.

20. The medium of claim 15 wherein executing recover to restore the disconnected data plane nodes comprises at least one of restarting devices associated with the disconnected data plane nodes and destroying the data plane node followed by recreating the data plane nodes in another virtual object or server computer.

21. The medium of claim 15 wherein executing recovery to restore the unavailable data cores comprises at least one of restarting devices associated with the disconnected data cores and destroying the data cores followed by recreating the data cores in one or more data plane nodes.

* * * * *